INVENTORS
RUSSELL E. KNEISLEY
NORMAN E. HYPES
DARRELL L. FLORY

BY
THEIR ATTORNEYS

FIG. 2A

| | CHECKS | FEES | DEPOSITS | NO. OF CHECKS | DATE |
|---|---|---|---|---|---|
| | | | BALANCE FORWARD | | JAN.30,55 |
| NO FEE POSITION 3 — CHECK & BAL. | 4,762.35 LS | | | 1 | FEB.18,55 |
| CHECK-DEP. & BAL. | 150.00 | | 1,000.00 | 1 | FEB.20,55 |
| DEPOSIT & BAL. | | | 500.00 | | FEB.27,55 |
| CHECK-DEPOSIT ANALYSIS & BAL. | 50.00 | .05 | 199.95 | 1 | MAR. 6,55 |
| CHECKS-DEPOSIT ANALYSIS & BAL | 200.00 600.00 | .05 .05 | 3,500.00 | 2 | MAR.13,55 |
| CHECK FEE POSITION 1 — CHECK DEP ANALYSIS 1 CHECK & BAL. | 50.00 | .05 | 50.00 | | |
| | 300.00 | .05 | | 2 | MAR.20,55 |
| CHECK CHECK CORRECTION CHECK & BALANCE | 250.00 250.00 EC 350.00 | .05 .05 .05 | | 1 | MAR.27,55 |
| | 200.00 600.00 | .05 .05 | | | |
| CHECKS-DEPOSIT DEPOSIT CORRECTION & BAL. | | .05 .05 .05 | 2,500.00 2,500.00 EC 3,500.00 | | |
| CHECK & DEPOSIT FEE POSITION 2 — DEPOSIT-ANALYSIS & CHECK & BAL. | | .05 | 5,000.00 | 2 | APR. 3,55 |
| DEPOSIT-CHECK & BAL. | 500.00 | .05 .05 | 50.00 | 1 | APR.10,55 |
| | 500.00 | .05 | | 1 | APR.17,55 |
| POSITION 4 — MONTHLY FEE | | 1.50 SC | | | APR.30,55 |

FIG. 2B

| BALANCE | DEPOSITS & CHECKS | FEES & ANALYSIS | NO. OF CHECKS | DATE | BALANCE | |
|---|---|---|---|---|---|---|
| 6,800.22 △ | | | | JAN. 30, 55 | 6,800.22 | △ 21 |
| 2,037.87 ✶ | 4,762.35 LS | | 1 | FEB. 18, 55 | 2,037.87 | ✶ 14 |
| | 150.00 − | | | | | 2 |
| 2,887.87 ✶ | 1,000.00 + | | 1 | FEB. 20, 55 | 2,887.87 | ✶ 10 |
| 3,387.87 ✶ | 500.00 ± | | | FEB. 27, 55 | 3,387.87 | ✶ 9 |
| | 50.00 − | .05 | | | | 5 |
| 3,537.77 ✶ | 199.95 + | 10 .20 | 1 | MAR. 6, 55 | 3,537.77 | ✶ 14 |
| | 200.00 − | | | | | 7 |
| | 600.00 − | | | | | 8 |
| 6,237.67 ✶ | 3,500.00 + | 1234 1,234.12 | 2 | MAR. 13, 55 | 6,237.67 | ✶ 3 |
| | 50.00 − | .05 | | | | 10 |
| | 50.00 + | 10 .20 | | | | 11 |
| 5,937.57 ✶ | 300.00 − | .05 | 2 | MAR. 20, 55 | 5,937.57 | ✶ 21 |
| | 250.00 | .05 | | | | 13 |
| | 250.00 EC | .05 | | | | 14 |
| 5,587.52 ✶ | 350.00 − | .05 | 1 | MAR. 27, 55 | 5,587.52 | ✶ 62 |
| | 200.00 − | .05 | | | | 16 |
| | 600.00 − | .05 | | | | 17 |
| | 2,500.00 + | .05 | | | | 18 |
| | 2,500.00 + EC | .05 | | | | 19 |
| 8,287.37 ✶ | 3,500.00 + | .05 | 2 | APR. 3, 55 | 8,287.37 | ✶ 37 |
| | 500.00 + | .05 | | | | 21 |
| | | 10 4 | | | | 22 |
| 12,787.27 ✶ | 500.00 | .05 | 1 | APR. 10, 55 | 12,787.27 | ✶ |
| | 50.00 + | .05 | | | | 24 |
| 12,337.17 ✶ | 500.00 | .05 | 1 | APR. 17, 55 | 12,337.17 | ✶ 44 |
| 12,335.67 ✶ | | 1.50 SC | | APR. 30, 55 | 12,335.67 | ✶ 14 |

INVENTORS
RUSSELL E. KNEISLEY
NORMAN E. HYPES
DARRELL L. FLORY

BY
THEIR ATTORNEYS

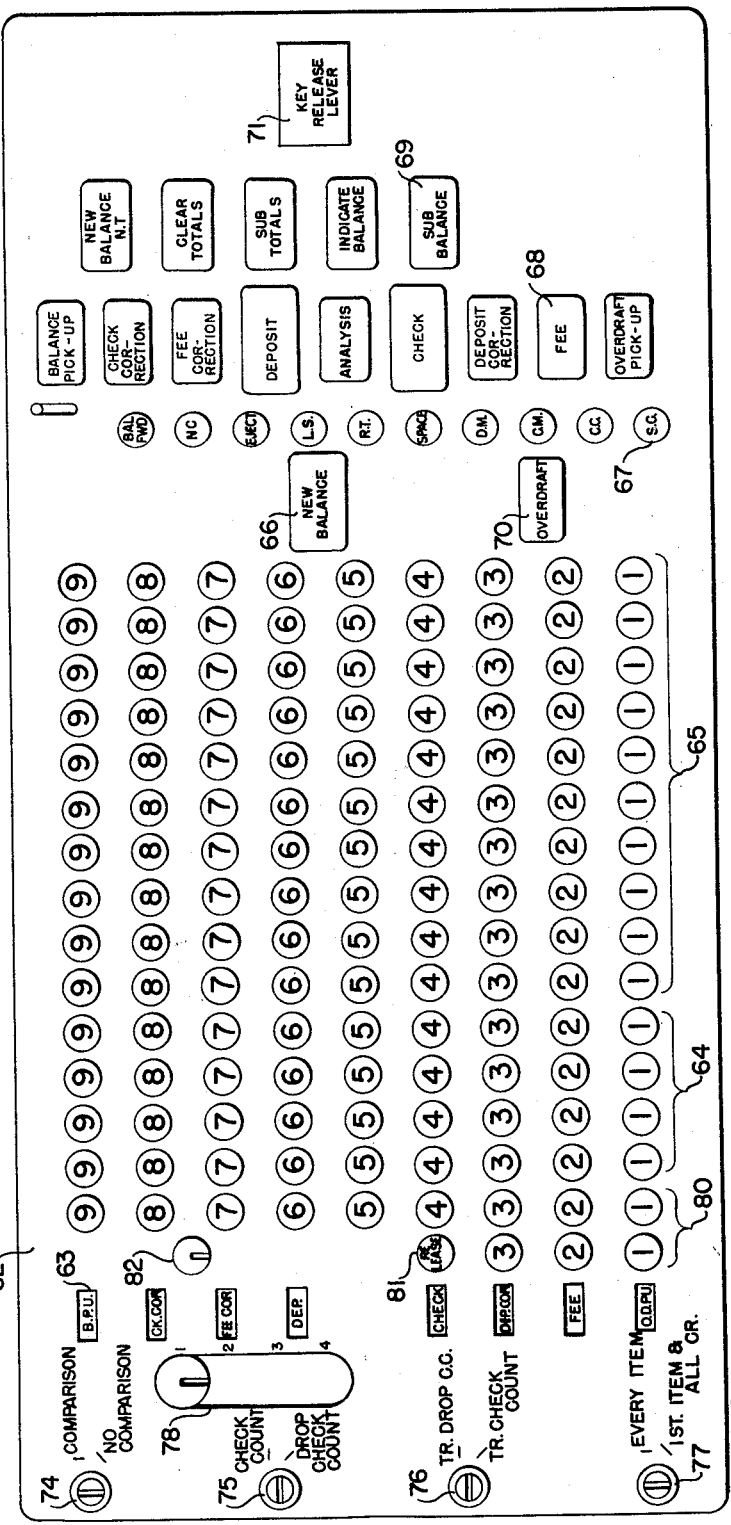

July 31, 1962 R. E. KNEISLEY ET AL 3,047,219
SELECTIVE AMOUNT TRANSFER CONTROL MECHANISM
FOR ACCOUNTING MACHINES
Filed June 8, 1960 12 Sheets-Sheet 5

INVENTORS
RUSSELL E. KNEISLEY
NORMAN E. HYPES
DARRELL L. FLORY

BY *Louis A. Kline*
*Albert L. Sessler, Jr.*

THEIR ATTORNEYS

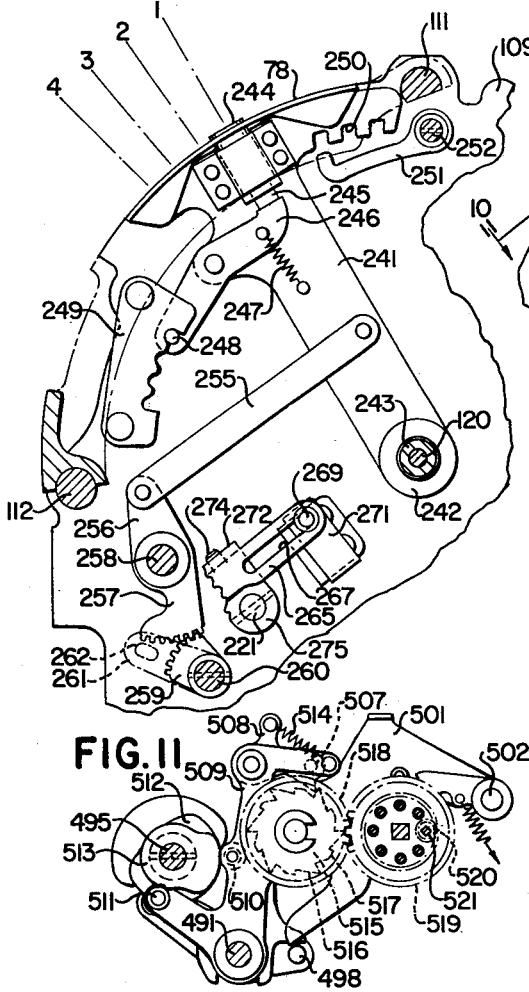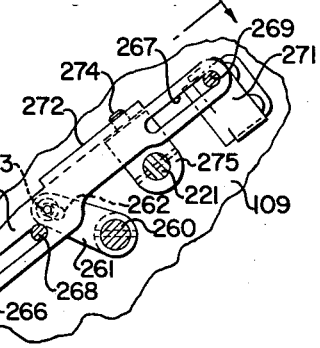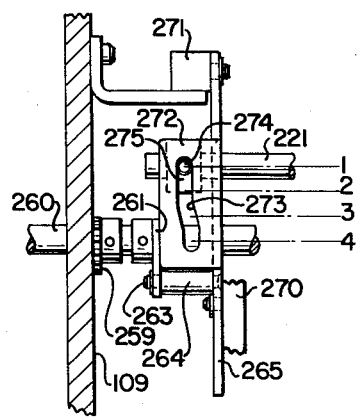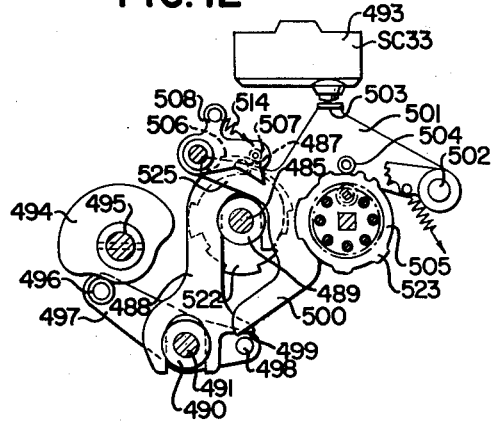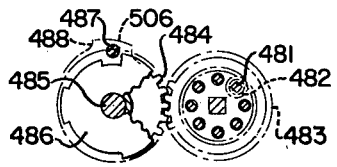

July 31, 1962  R. E. KNEISLEY ET AL  3,047,219
SELECTIVE AMOUNT TRANSFER CONTROL MECHANISM
FOR ACCOUNTING MACHINES
Filed June 8, 1960  12 Sheets-Sheet 7

INVENTORS
RUSSELL E. KNEISLEY
NORMAN E. HYPES
DARRELL L. FLORY

BY

THEIR ATTORNEYS

July 31, 1962
R. E. KNEISLEY ET AL
3,047,219
SELECTIVE AMOUNT TRANSFER CONTROL MECHANISM
FOR ACCOUNTING MACHINES
Filed June 8, 1960
12 Sheets-Sheet 8
FIG. 19
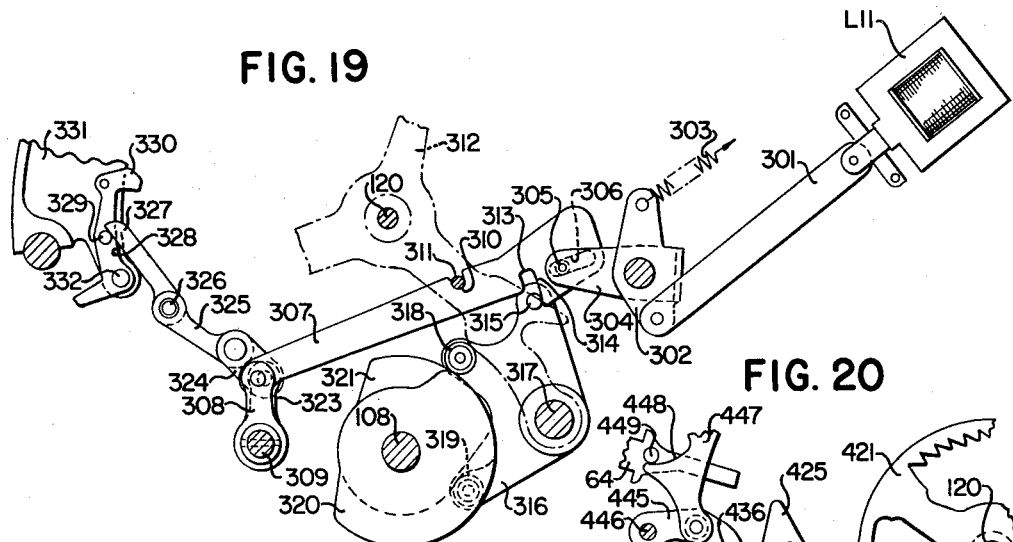
FIG. 20
FIG. 21
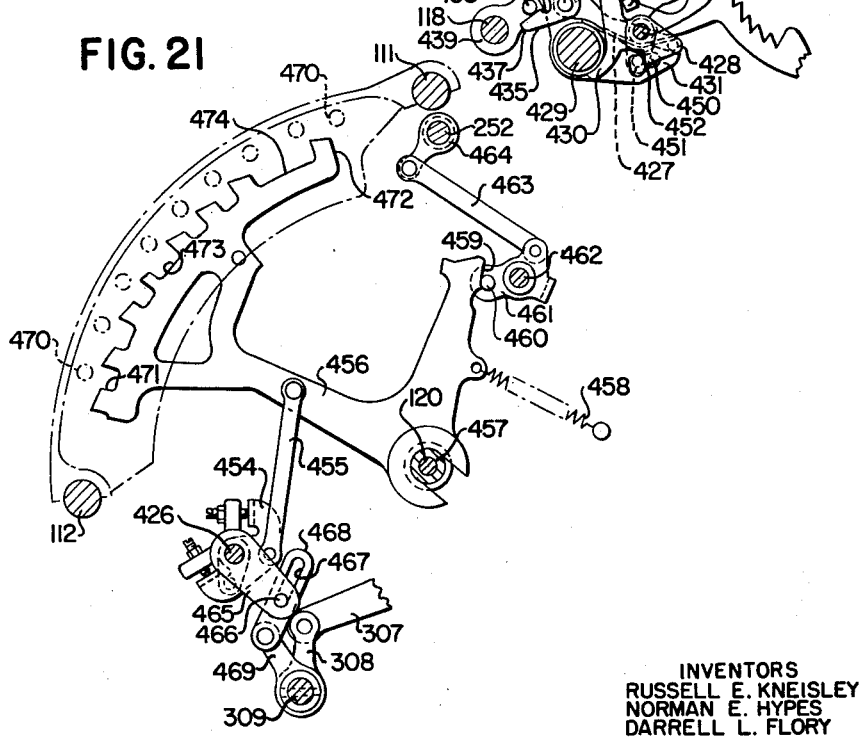
INVENTORS
RUSSELL E. KNEISLEY
NORMAN E. HYPES
DARRELL L. FLORY
BY *Louis A. Kline*
*Albert L. Sessler, Jr.*
THEIR ATTORNEYS

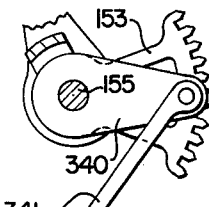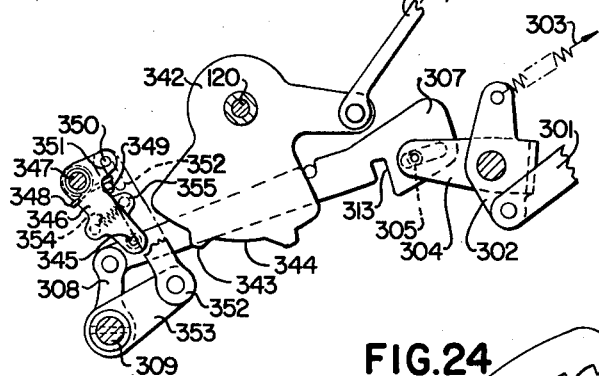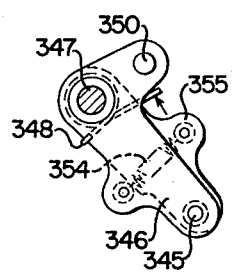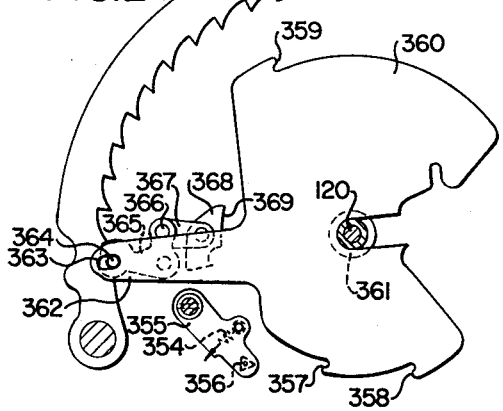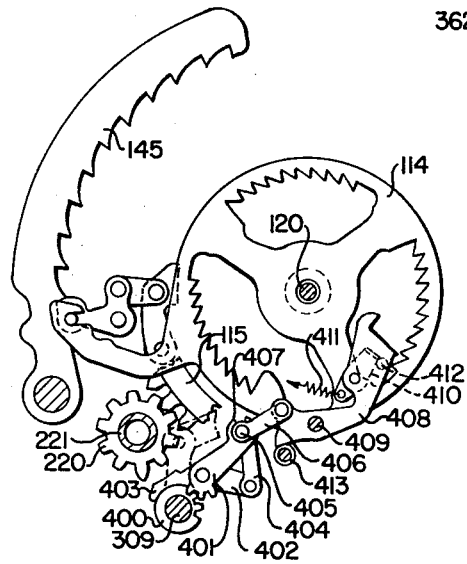

July 31, 1962
R. E. KNEISLEY ET AL
3,047,219
SELECTIVE AMOUNT TRANSFER CONTROL MECHANISM
FOR ACCOUNTING MACHINES
Filed June 8, 1960
12 Sheets-Sheet 10

INVENTORS
RUSSELL E. KNEISLEY
NORMAN E. HYPES
DARRELL L. FLORY

BY
THEIR ATTORNEYS

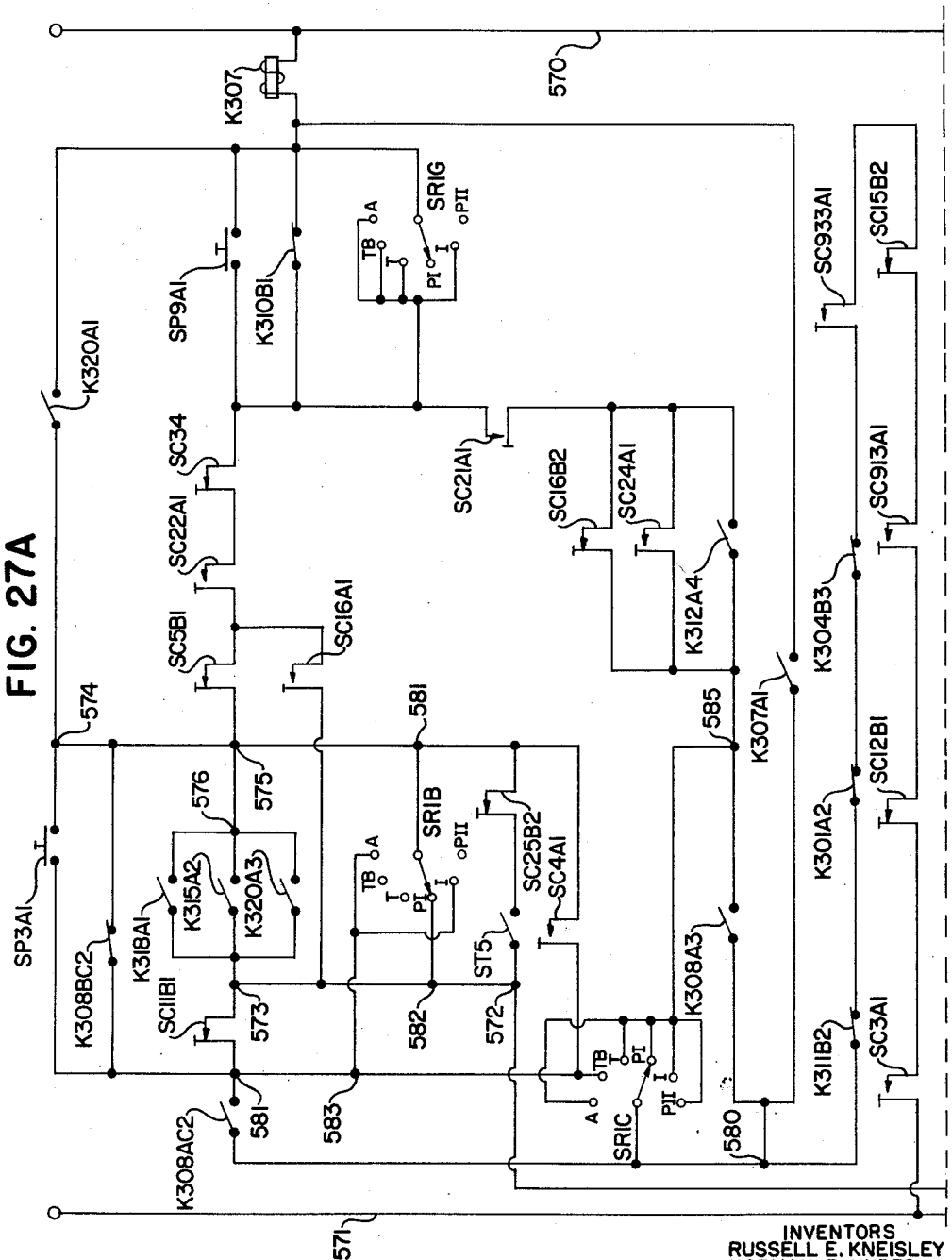

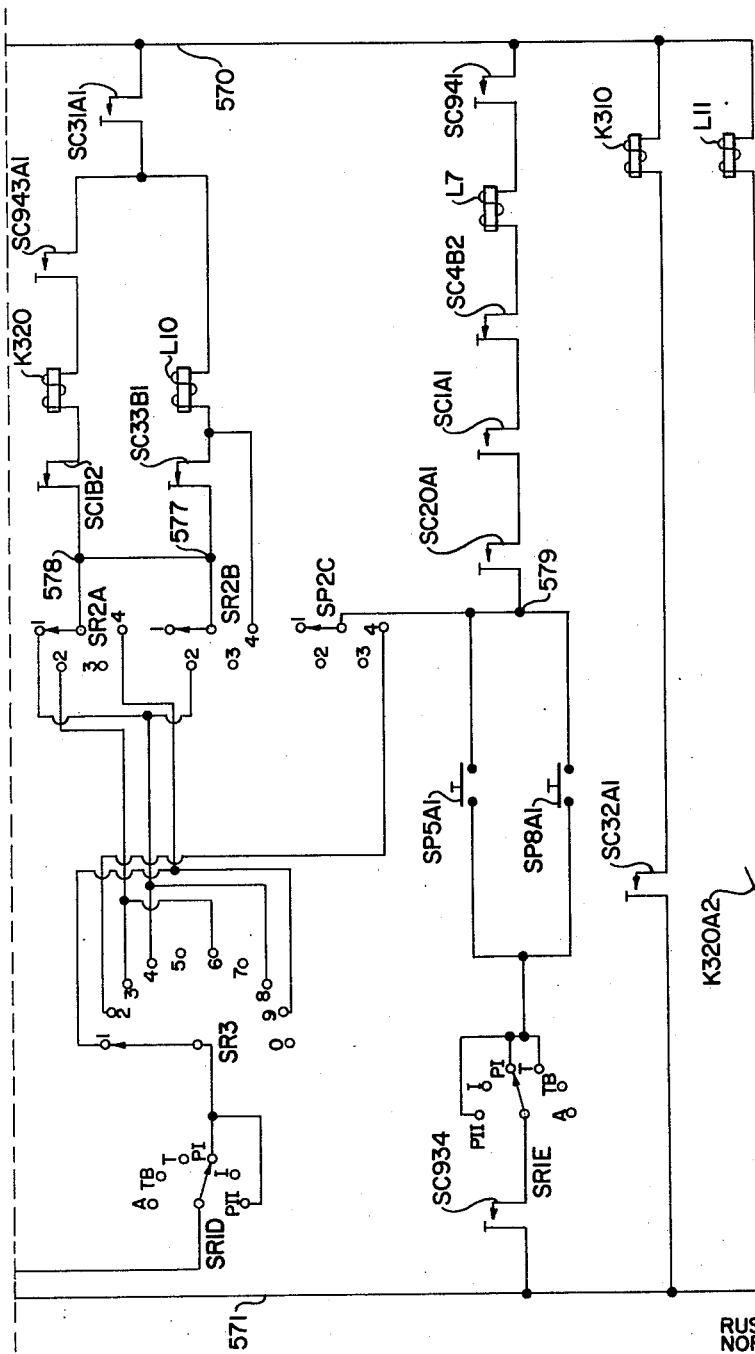

United States Patent Office 3,047,219
Patented July 31, 1962

3,047,219
SELECTIVE AMOUNT TRANSFER CONTROL MECHANISM FOR ACCOUNTING MACHINES
Russell E. Kneisley, Norman E. Hypes, and Darrell L. Flory, Dayton, Ohio, assignors to The National Cash Register Company, Dayton, Ohio, a corporation of Maryland
Filed June 8, 1960, Ser. No. 34,693
20 Claims. (Cl. 235—60.3)

This invention relates generally to accounting machines which operate in conjunction with a magnetically coded ledger card to enable the picking up of an old balance and other information from the ledger card and the subsequent recording of a new balance and other information on the ledger card at the end of an accounting transaction. In particular, the invention relates to such a machine in which means are provided for selective addition or subtraction of predetermined amounts following certain operations to or from the various totals maintained in such a machine, for the purpose of providing automatic service charge entries on the various accounts handled by the machine.

The present invention is well adapted for use with an accounting machine of the type disclosed in the United States patent application Serial No. 610,754, filed September 19, 1956, by inventors Konrad Rauch et al., now United States Patent No. 2,947,475, issued August 2, 1960, but is not limited to use with such a machine.

In many accounting systems in which it is desired to use a machine of the type described in the above-cited patent application, it is customary to charge a fee to an account each time a check is drawn on the account. Such a system may alternatively provide for a fee to be charged each time a check or deposit entry is made in the account, or may provide instead for a periodic fee, such as a monthly fee, to be charged to each account.

Until the present time, it was necessary for the machine operator to enter such fees manually. This, of course, resulted in extra effort on the part of the machine operator, required additional time, and introduced the possibility of error, either in the amount of fee charged, or in the type of transaction with which a fee was associated.

The present machine is designed to overcome the above deficiencies by providing means for automatic fee entry in proper circumstances. This results in a saving in operator time and effort, and greatly reduces the possibility of error in the entry of fees on an account.

In addition, a number of interlock means are provided to insure that fee operations take place in the correct sequence, and that other operations cannot be initiated when a fee operation is taking place.

Accordingly, it is an object of the present invention to provide an accounting machine capable of automatically performing operations in which a service charge is registered on an account following a selected one of several different types of operations.

A further object is to provide an accounting machine capable of automatically initiating an operation for entry of a predetermined amount following certain other machine operations.

An additional object is to provide an accounting machine capable of automatically initiating operations in which a service charge is registered on an account, said machine having interlock means to insure that the service charge operation takes place in proper sequence, and to prevent improper operations from taking place instead of a service charge operation.

With these and other objects, which will become apparent from the following description, in view, the invention includes certain novel features of construction and combination of parts, a preferred form of embodiment of which is hereinafter described with reference to the drawings which accompany and form a part of this specification.

In the drawings:
FIG. 1 is a cross-sectional view showing one of the amount denominational order differential mechanisms, together with the associated fee counter.

FIGS. 2A and 2B, taken together, constitute a view of a ledger card supplied with magnetizable areas for controlling the machine.

FIG. 3 is a diagrammatic view of the amount and control keyboard for the machine.

FIG. 8 is a detail view of the fee program selector and associated control mechanism.

FIG. 9 is a side detail view of the counter-shifting slide which is controlled by the fee program selector.

FIG. 10 is a plan view of the counter-shifting slide which is controlled by the fee program selector.

FIGS. 11, 12, and 13 are detail views of the automatic selecting mechanism which controls the selection of the check hammers, the spacing of the table of the accounting machine, and the spacing of the journal sheet used in the accounting machine, FIGS. 11 and 12 also showing switch-operating means controlled by Control Row 3.

Figure 14:
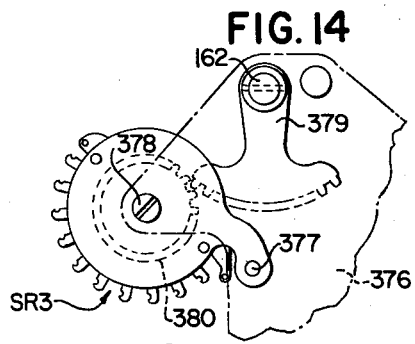

FIG. 14 is a fragmentary detail view showing a switch controlled by Control Row 2 of the accounting machine keyboard, and the manner in which it is controlled.

Figure 15:
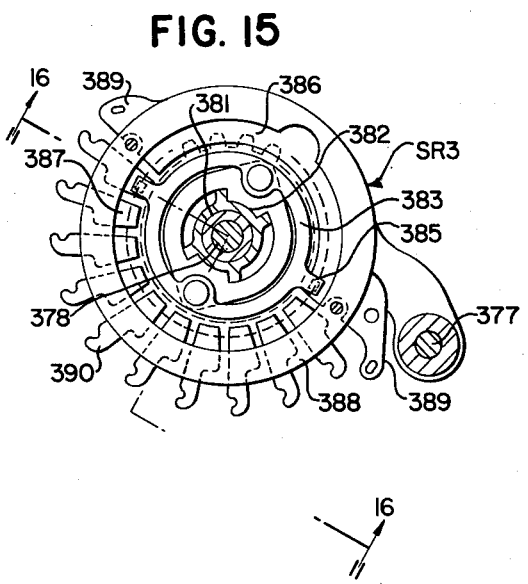

FIG. 15 is an enlarged sectional view showing the switch of FIG. 14.

Figure 16:
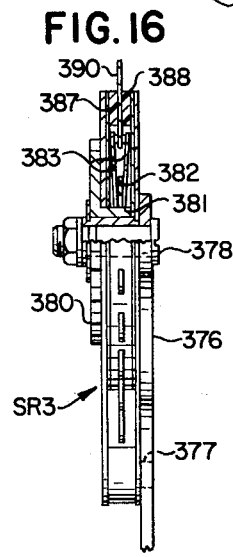

FIG. 16 is a sectional view taken along line 16—16 FIG. 15.

Figure 17:
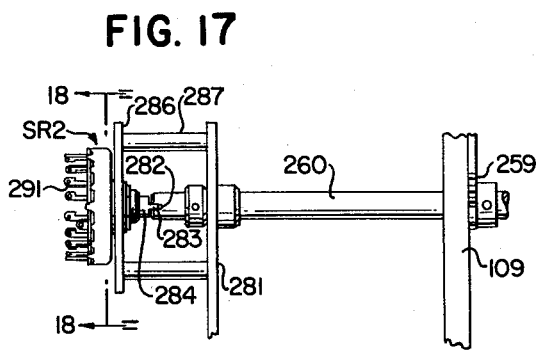

FIG. 17 is a detail view showing a switch controlled by the fee program selector.

Figure 18:
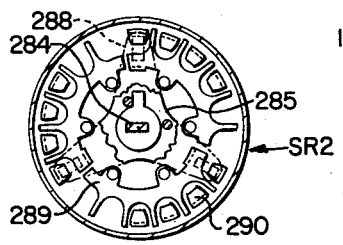

FIG. 18 is an enlarged sectional view taken along line 18—18 of FIG. 17, showing the details of a switch controlled by the fee program selector.

FIG. 19 is a detail view showing the mechanism controlled by the solenoid L11.

FIG. 20 is a fragmentary detail view showing a portion of the check count mechanism of the accounting machine.

FIG. 21 is a detail view showing the mechanism for disabling the check count mechanism.

FIG. 22 is a detail view showing the selecting plate associated with row 2 of the accounting machine keyboard, and also showing the mechanism for sensing the selecting plate.

FIG. 23 is a detail view showing a flexible connection between two parts of the sensing mechanism of FIG. 22.

FIG. 24 is a detail view showing a control plate of row 2 which is adapted to be controlled through the sensing mechanism shown in FIGS. 22 and 23.

FIG. 25 is a detail view showing the mechanism for control of the differential mechanism of the accounting machine by the corresponding fee counter.

Figure 26:
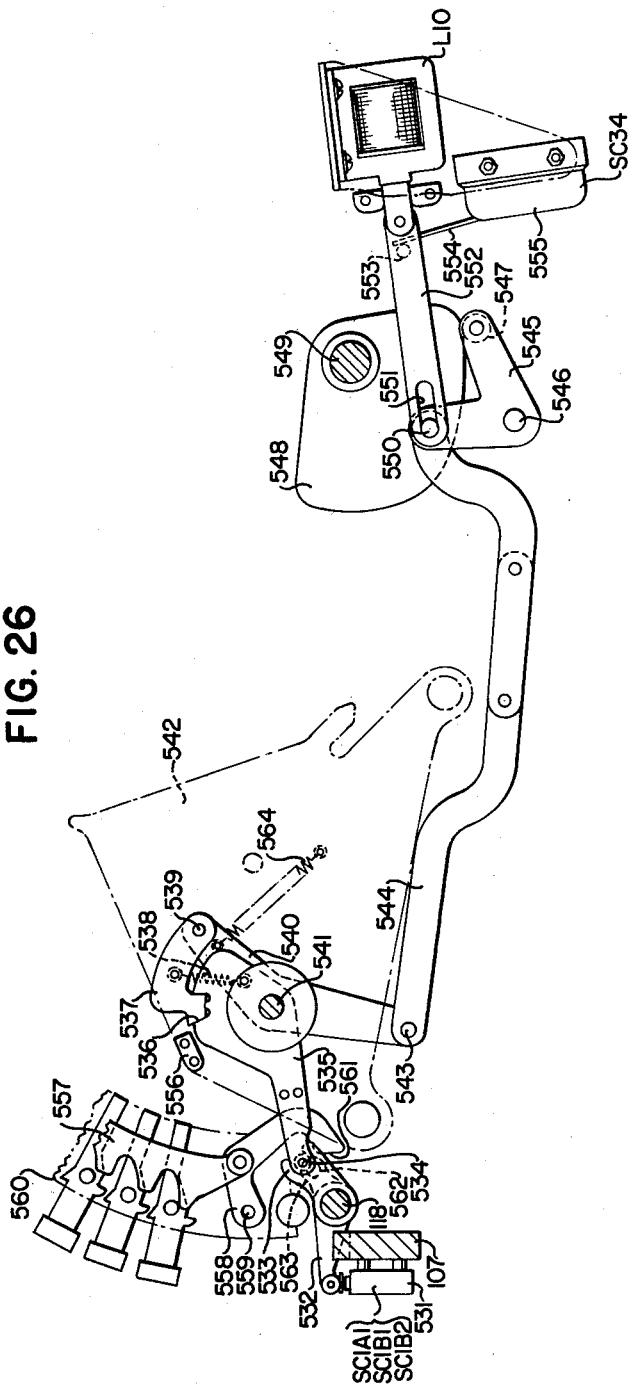

FIG. 26 is a detail view showing the mechanism controlled by the solenoid L10.

FIGS. 27A and 27B, taken together, form a diagram showing the operating circuitry which is used in the accounting machine of the present invention.

GENERAL DESCRIPTION

The present invention is shown embodied in an accounting machine of the type described and claimed in the United States patent application Serial No. 610,754, filed September 19, 1956, by inventors Konrad Rauch et al. This accounting machine is controlled from a ledger card on which are printed the usual amounts pertaining to the account, such as the checks and deposits, the balances after each transaction entry, the check count, the sign of the balance, the date, etc. In addition, the ledger card has recorded thereon magnetically the last balance and related data, such as the comparator number, which in this case is the account number, the sign of the balance, the check count, and the number of the line on which the next entry is to be printed on the ledger card.

A plurality of sensing and recording heads are provided on the accounting machine for sensing the data which is magnetically encoded on the ledger card, and for erasing previously-stored data and recording new data thereon. The heads are electrically connected to data-retaining means in the accounting machine, so that data on the ledger card may be entered into the accounting machine, and so that data produced by the accounting machine may be recorded on the card. The machine is also controlled from the keyboard, on which data may be set to be printed on the card and to be combined with data read from the card to form new balances. In a new-balance-recording operation, the data pertaining to the new balance is printed on the ledger card; the previous magnetically-stored data is erased; and the new balance, and related data pertaining to the new balance, are magnetically stored on the card in its place.

In addition to the usual interlocks which have previously been provided on the bank posting machine, the machine described and claimed in the above-cited patent application is provided with further safeguards to insure correctness of the pickup operation. One of these safeguards is a check to be sure that all of the data has been sensed or read from cards. Failure to read any data will prevent the entry of the remaining data into the machine and will cause the card to be immediately fed from the machine.

Another of these safeguards is a check to be sure that the data which was read has been correctly entered into the machine by comparing the data actually set in the machine with the data actually recorded on the card. This is accomplished by first reading the ledger card and controlling the setting of the machine according to the data which was read and then reading the card the second time and comparing the second reading with the actual setting of the machine. If there is no agreement, the further normal operation of the machine is prevented, and only a corrective operation of the machine may take place.

A further safeguard cooperates with the above two safeguards to insure that overprinting on the ledger will be avoided. This involves the automatic recording of the line number on the card corresponding to the line on which the next printing is to be made. Accordingly, if the number is read correctly and is correctly set in the machine, as indicated by the two safeguards previously mentioned, then the card will be positioned in the next operation with the proper line thereon in printing position.

The accounting machine is provided with a further safeguard to insure correctness of the entries. As previously described, a comparator keyboard is provided, on which a comparator number, such as the account number, may be set, and the number thus set up can be compared with the number read from the ledger card to insure that the check or the deposit is being posted to the correct account. Failure of the numbers to agree will cause the machine to be rendered inoperable immediately and will prevent the data from being entered into the machine.

These automatic safeguards and checking means together with the usual interlocks and controls, insure virtually "error-proof" operations without the necessity of running proofs on work already performed.

The machine described in the previously-cited application is provided with a data storage means, in which the balance and check count are stored when they are read, and in which they are retained until it is determined that something has been read from each channel on the card and that there has been agreement between the account number read from the card and that set in the account number keyboard. If data is read from each channel on the card, and if the account numbers agree, then the balance and the check count are entered into the totalizers of the machine under control of the data storage means. If there is a failure to read data from any channel on the card, or if the account numbers do not agree, the card is immediately fed from the machine, as indicated above, and the balance and the check count are not entered into the totalizers of the machine. By thus storing the balance and the check count until it is determined that data has been read from all of the channels on the card, and until it is determined that there is agreement between the account numbers, incorrect entries and corrective operations of the machine are minimized.

This storage of balance and check count until the account number has been determined also enables a "stop payment" signal to be obtained to call the operator's attention to the fact that a "stop payment" order has been placed on the account and to enable the operator to examine the check, before the entries are made into the totalizers, to see whether it is the check upon which the "stop payment" was placed. This is accomplished by recording a "stop payment" number on the ledger card instead of the account number, so that the comparator mechanism will show a failure of comparison and will prevent the entry of the balance whenever it is attempted to post to the account in the usual manner. Upon verification that the check is not the one against which the "stop payment" order has been placed, it may be posted by setting the "stop payment" number in the comparator keyboard and operating the machine in the usual manner. In this manner, the posting of a check on which a "stop payment" order has been placed is prevented.

The accounting machine is also provided with extremely flexible controls which enable it to perform different types of operations involving reading and recording operations on the cards. For example, with one setting of the controls, the card-reading operation may be eliminated, and data may be set up on the keys of the machine and recorded magnetically on the card; with another setting of the controls, a normal posting operation may take place involving the reading of the card to pick up the old balance, the entering of checks and/or deposits by operating the machine under control of the keys, and the recording of the new balance on the card; with a further setting of the controls, the machine may be controlled to transfer certain stored data from one card to another, as at the end of the month or accounting period, and in this operation data is read from the card and set up in the machine, the old card is removed from the machine and a new card is put into the machine, and certain of the data which was read is recorded on the card; and, with a still further setting, the controls will be effective to cause the machine to operate in a trial balance operation, in which the stored data is read, the old balance and the check count are entered into the machine, and the card is ejected without erasure of the stored data or the recording of any further data thereon.

For a more detailed description of the construction and operation of those parts of the accounting machine which do not form a part of the present invention, reference may be had to the previously-mentioned United States patent application, Serial No. 610,754.

DETAILED DESCRIPTION

Ledger Card

An accounting machine embodying the present invention is adapted to be controlled by data magnetically recorded on a ledger card 51 (FIGS. 2A and 2B) having means thereon to store this data.

The ledger card 51, which is used to control entries into the accounting machine, is vertically lined on its front side to provide a plurality of columns for receiving records of entries. In its normal use, after the card is completed, or at the end of an accounting period, it is separated into two parts along a line 52, one of which parts will be sent to the customer, and the other of which parts will remain with the organization using the machine, for record-keeping purposes. Accordingly, similar information is printed on both sides of the ledger card, although the columnar arrangement on the two sides of the card is somewhat different. Examination of FIGS. 2A and 2B shows that the columns on the left side of the line 52 include spaces for "Checks," "Fees," "Deposits," "No. of Checks," "Date," and "Balance." On the right side of the ledger card, as shown in FIG. 2B, are column spaces for "Deposits & Checks," "Fees & Analysis," "No. of Checks," "Date," and "Balance." All of the information relating to various columns on both sides of the line 52 is mechanically printed on the ledger card by the accounting machine during its operation. Typical numerical entries are printed for purposes of illustration upon certain lines of the ledger card 51 shown in FIGS. 2A and 2B.

The card 51 is provided on its rear side with a number of strips or areas 53, of magnetizable material, which can be distinctly magnetized to represent data. Each area 53 may provide two channels in which data can be stored, which data can be used to control the machine to enter the data therein or to provide other related controls.

In order that the card 51 may be clamped securely to the card carriage of the accounting machine 50, and in order that the card may be aligned properly with the printing mechanism of such machine and with the reading and recording heads thereof, the carriage is provided with locating pins adapted to cooperate with openings 54 near the top of the card, to insure that the card will be fed into and out of the machine in proper alignment with the head and the printing mechanism. The holes 54 not only insure that the ledger card 51 is correctly positioned with respect to the reading and recording heads and with respect to the printing mechanism of the accounting machine, but also insure that the ledger card is positioned on the card carriage right side up, the intermediate hole 54 being offset from the center of the card. This intermediate hole 54 acts as the main locating hole, and the two side holes 54 are elongated to allow for slight changes in the width of the ledger card due to temperature and humidity changes and to provide greater bearing area between the pins and the card.

Keyboard

The accounting machine embodying the present invention is provided with a keyboard 62, shown diagrammatically in FIG. 3.

At the extreme left of the keyboard, as viewed in FIG. 3, are a plurality of key-controlled switch elements 74, 75, 76, and 77, which control various functions of the accounting machine. The setting of the switch 74 determines whether or not account number comparison is to be required in the operation of the accounting machine. The setting of the switch 75 determines whether a check count is to be maintained or dropped in the functioning of the accounting machine. The setting of the switch 76 determines whether a check count is to be maintained or dropped during transfer operations. The setting of the switch 77 determines whether an account number comparison is required for every item during the accounting machine operation, or only for the first item pertaining to a particular account plus all credit items.

To the right of the switch 75 on the keyboard 62 is located the fee program selector 78. This element is key-controlled, so that it can be set to any one of four different positions and locked in the selected position. The four positions relate to four different programs controlling the type of fee operation desired to be utilized.

When the fee program selector is in position 1, the accounting machine automatically prints a predetermined fee after each check-posting operation, and also automatically prints a fee correction after each check-correction-posting operation. The amount of the fee is added to a fee total carried in the machine, and is subtracted from the balance of the account, while the reverse is true of a fee correction.

In position 2, the accounting machine automatically prints a fee of predetermined value after each check or deposit operation, and automatically prints a fee correction after each check correction or deposit correction operation. Here again, the amount of the fee is added to a fee total carried in the machine, and is subtracted from the balance of the account, while the reverse is true of a fee correction.

In position 3, the accounting machine functions without computation or printing of any fee.

In position 4 of the fee program selector, the accounting machine functions to print a periodic fee, such as a monthly fee. In this type of operation also, the amount of the fee is added to a fee total carried in the machine, and is subtracted from the balance of the account.

The manner in which the various controls are exerted by the fee program selector to produce the desired fee operations of the accounting machine will be fully described subsequently.

To the right of the fee program selector 78, as viewed in FIG. 3, are a plurality of visible item counters 63, which function to keep total records of various types of transactions.

To the right of the item counters 63 are two rows of keys 80, which are used to index the date for printing, when desired. It will be noted that the left row of these two rows has only the keys 1, 2, and 3, since these are all that will be required for date-indexing purposes.

In the same row as the left row of the date keys is a release key 81, which may be used to release the date keys 80 of the keyboard 62. Above the key 81 is a lock 82, which may be used to lock selected date keys 80 in depressed position, if desired.

The next four rows of keys 64 are used for indexing in the machine a number corresponding to a total number of checks, the total amount of which checks may be entered into the machine in a listing operation. The differential mechanisms of the corresponding rows of the machine are operated in accordance with the information entered thereon by the keys 64 in order to enter such information into the machine for printing purposes.

The next ten rows of keys are amount keys 65, which are used for setting up amounts, such as old balances, the amounts of checks and deposits, and any other desired information which is represented by dollars and cents or any other numbers.

A new balance key 66 is provided on the keyboard 62 for initiating a new balance operation of the accounting machine.

Below the new balance key 66 is an overdraft key 70.

The rows of keys 67, 68, and 69 are control keys on control rows 3, 2, and 1, respectively, for controlling the various operations of the machine.

To the right of the key 69 of row 1 is a key release lever 71, which may be operated to release any depressed keys on the accounting machine keyboard 62, except the date keys 80, which are released by the release key 81, as previously mentioned.

Amount Banks and Amount Differentials

Figure 1:
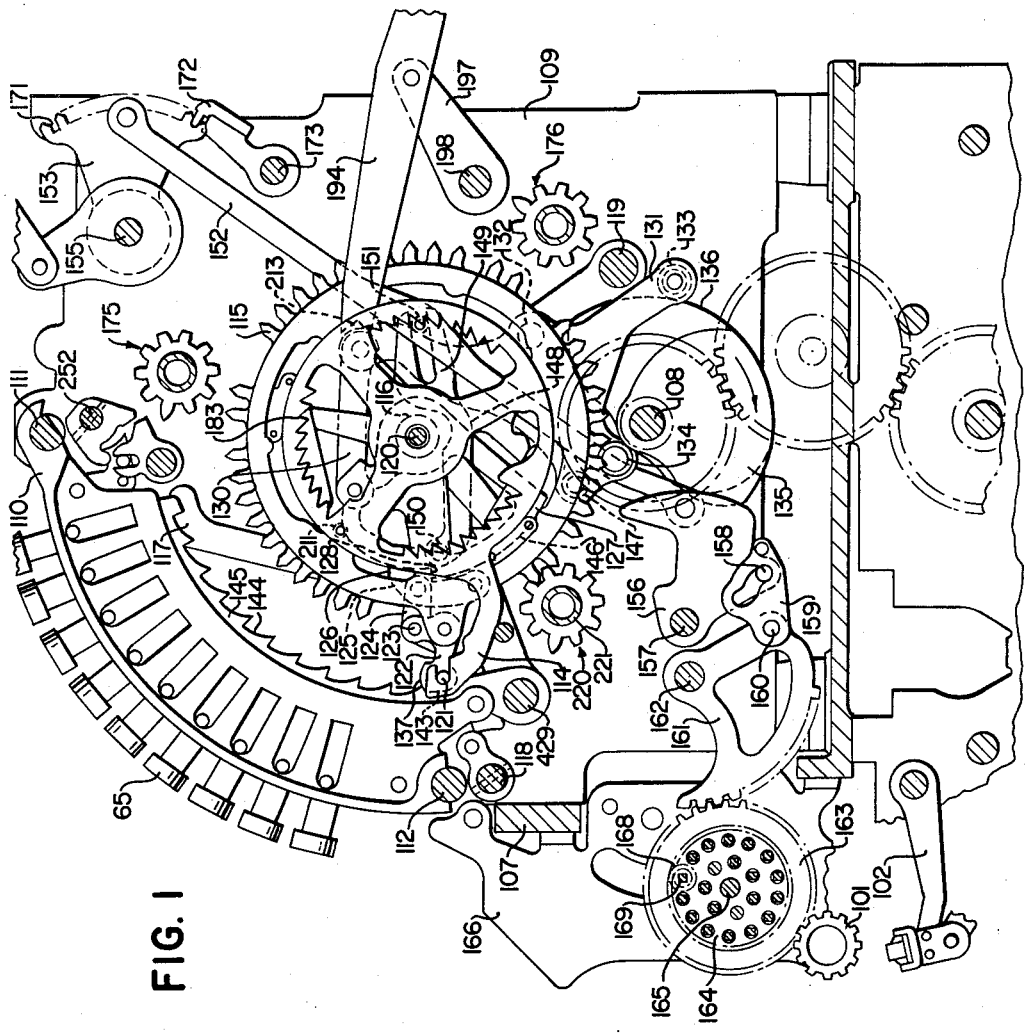
Figure 4:
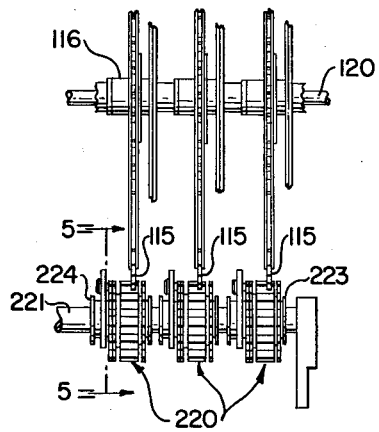
FIG. 4 is a fragmentary side-spacing view, showing certain of the differential mechanisms and their associated fee counters.
Figure 5:
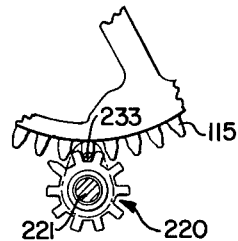
FIG. 5 is a fragmentary detail sectional view, taken along line 5—5 of FIG. 4, showing the manner in which a fee counter cooperates with the teeth on its associated differential mechanism.

Since the ten banks of amount keys 65 and their associated differential mechanisms are all alike, only one of said banks and the differential mechanism associated therewith will be described. This differential mechanism is shown in FIG. 1, which is a transverse sectional view of the machine taken just to the right of the amount bank, showing the bank and its associated differential mechanism.

The amount keys 65 are mounted in a key bank frame 110, supported by rods 111 and 112, extending between main side frames 109 (only one of which is shown) of the machine. Depression of any one of the amount keys 65 rocks a zero stop pawl (not shown), associated with that particular denomination, counter-clockwise out of the path of a reset spider 114, in a manner well known in the art. The reset spider 114 is free on a hub of an amount differential actuator 115, rotatably supported on a bushing 116, extending between two similar support plates 117 (only one shown here), said plates being in turn supported by rods 429 and 119, extending between the main side frames 109. There are a pair of supporting plates 117 for each amount differential, and a tie rod 120 extends through holes in the center of a bushing 116 to secure all of the amount differentials in a compact unit.

A notch in the forward end of the spider 114 engages a stud 121, in the forward extension of a bell crank 122, pivoted on an extension of the actuator 115. Carried by the vertical arm of the bell crank 122 is a stud 123, on which is pivoted a link 124. The link 124 is also pivoted to the upper end of a latch 125, pivotally mounted on the actuator 115. The latch 125 has a foot 126, normally held in contact with the periphery of a driving segment 127, just above a shoulder 128 thereon, by means of a spring (not shown). The driving segment 127 is rotatably supported on the hub of the actuator 115. A link 130 pivotally connects the driving segment 127 to a cam lever 131, pivoted on a stud 132, on the left-hand one of the plates 117, said lever 131 carrying rollers 133 and 134, which coact with the peripheries of cams 135 and 136, respectively, secured on a main shaft 108. Depression of any one of the amount keys 65 moves its lower end into the path of a rounded surface 137 of an extension of the forward arm of the bell crank 122.

In adding operations, the main shaft 108 and the cams 135 and 136 make one clockwise rotation, causing the lever 131 to rock the driving segment 127 first clockwise and then counter-clockwise, back to normal position. Clockwise movement of the segment 127 causes the shoulder 128 thereon, in cooperation with the foot 126 of the latch 125, to carry the latter and the amount actuator 115 clockwise in unison, until the rounded surface 137 contacts the stem of the depressed amount key 65. This rocks the bell crank 122 and, through the link 124, the latch 125 counter-clockwise, to disengage the foot of the latch from the shoulder 128 to arrest clockwise movement of the actuator 115 and to position said actuator according to the value of the depressed amount key 65. This disengagement of the latch 125 moves a rounded extension 143 of the arm 124 into engagement with the corresponding one of a series of locating notches 144 in a plate 145, secured between the rod 429 and the upper extension of the left-hand support plate 117.

After the latch 125 is disengaged from the shoulder 128, an arcuate surface 146, on the segment 127, moves opposite the foot 126 to retain the latch disengaged in its set position.

When the lever 131 reaches the terminus of its clockwise movement, a roller 147, carried thereby, coacts with an arcuate surface 148 on a beam 149, pivoted on a stud 150 in the actuator 115, and forces a concave surface on the upper edge of said beam into contact with the hub of the actuator 115 to move the rear end of said beam into a position commensurate with the value of the depressed amount key.

The rear end of the beam 149 is bifurcated to engage a stud 151 on a link 152, the upper end of which link is pivoted to a segment 153, mounted on one of a set of nested sleeves supported by a shaft 155, journaled between the main side frames 109. The lower end of the link 152 is pivotally connected to a segment arm 156, pivoted on a shaft 157, journaled between the side frames 109. The segment arm 156 carries a stud 158, which engages a camming slot in a zero elimination cam plate 159, pivotally mounted on a stud 160 on a segmental gear 161. The segmental gear 161 is rotatably mounted on a shaft 162, journaled between the side frames 109.

The teeth of the segmental gear 161 mesh with external teeth of an external-internal ring gear 163, having internal teeth, which, in cooperation with the periphery of a disc 164, form a rotatable support for said gear 163. The disc 164 is fixed on a shaft 165, and the latter is supported by brackets 166 secured to a cross bar 107 and the main framework of the machine. The internal teeth of the ring gear 163 mesh with a pinion 168, rotatably supported in a boring in the disc 164. The pinion 168 is mounted on a square shaft 169, and the shaft 169 has mounted thereon pinions, like the pinion 168, for each columnar position in which an entry is to be made.

Type wheels 101 cooperate with printing hammers 102 to effect printing on the ledger card 51. These type wheels 101 are driven from the internal gear drive unit including the gear 163, the disc 164, the shaft 165, and shafts and pinions, such as the shaft 168 and the pinion 169, in a manner which is fully explained in the United States patent to Charles H. Arnold No. 2,141,332, which issued on December 27, 1938, and which embodies an application of the well-known principle of driving mechanism as disclosed in the United States patent to Walter J. Kreider No. 1,693,279, which issued on November 27, 1928.

To properly aline the differential mechanism and the type wheels set thereby, there is provided on each of the segments 153 a series of notches 171, engaged by an aliner 172, secured to a shaft 173, journaled in the machine side frames.

The aliner 172 is disengaged from the notches 171 during the differential setting of the type wheels; and, after they have been set under control of the amount keys 65, in the manner just described, the aliner 172 is again moved into engagement with the notches 171 to hold the type wheels during the printing operation.

Totalizers

The machine embodying the present invention has two lines of totalizers, including an upper totalizer line 175 (FIG. 1) and a back totalizer line 176 (FIG. 1). The totalizer line 175 comprises a balance totalizer, often referred to as a "crossfooter," which includes a denominational set of plus and minus wheels, said plus and minus wheels in each denominational order being reversely geared together, so that, when one wheel is turned in one direction, the other turns in the opposite direction, and vice versa, as is well known in the art and fully described in the United States patent to Bernis M. Shipley No. 1,619,796, which issued on March 1, 1927. The totalizer line 176 includes a plurality of individual totalizers as follows: plus new balance, minus new balance, fee, fee correction, check total, deposit total, check correction, deposit correction, and check count. It will, of course, be realized that the particular totalizers enumerated above are illustrative only, and that other totalizers may be used with the present invention, if desired or necessary.

The totalizers on the totalizer lines 175 and 176 are selectively engaged with the differential actuators 115 during counter-clockwise movement of the actuators in adding and subtracting operations and during the clockwise movement of the actuators in the second cycle of total and sub-total operations, as fully described in the previously-mentioned Bernis M. Shipley Patent No. 1,619,-796. The related differential mechanism is controlled during total-taking operations by the totalizer wheel when the wheel is turned to zero. In this position, a stop is moved into a notch 183 in the reset spider 114, to arrest the spider in a position commensurate to the value of a totalizer wheel which is being reset to zero. The reset spider 114, when thus arrested, is effective, through the notch engaging the stud 121, to disengage the latch 125 from the driving segment in the manner well-known in the art and fully described in said Shipley patent.

*Auxiliary Differential Mechanism*

The various differential mechanisms of the accounting machine of the present invention are controlled to be differentially set under control of data recorded magnetically on the areas 53 (FIGS. 2A and 2B) on the back of each ledger card 51. This control is effected by means of the auxiliary differential mechanisms (not shown), one of which is provided for each of the channels on the card. The auxiliary differential mechanisms are differentially settable under control of the data recorded in the magnetic areas on the ledger card as the ledger card is being fed into the machine in a balance pickup operation, and function to temporarily store the data until it is entered into the machine. Both the auxiliary differential mechanisms and the electrical controls which are operable to control their setting are fully disclosed in the previously-mentioned United States patent application Serial No. 610,754.

The auxiliary differential mechanisms are operable to differentially position stopping means which cooperate with the reset spiders 114 of certain of the differential mechanisms, and with a corresponding arm of the differential mechanism for the control Row 2, to control the setting of these differential mechanisms.

The stopping means for arresting each reset spider 114 (FIG. 1) comprises a differentially-settable stop member 194, pivoted on a differentially-positionable bell crank forming a part of a corresponding auxiliary differential mechanism (not shown), and also supported near its center by an arm 197, pivoted on a shaft 198.

During the time that the ledger card is fed into the machine in a balance pickup operation, the data represented on respective magnetic areas of a ledger card control the operation of the auxiliary differential mechanisms corresponding to these areas. When a control point on a magnetic strip or area 53 of the ledger card 51 representing a digit of a certain value reaches the reading and recording head, the auxiliary differential mechanism is set so that an end 213 of the stop arm 194 is positioned in the path of a stud 121 on the reset spider 114. Therefore, when the stud 121 is moved upon the rocking of the reset spider 114, said stud, engaging the end 213 of the stop member 194, arrests the spider 114 in a position commensurate with the value picked up from the card. The arresting of the reset spider 114, through the stud 121, disengages the latch 125 from the driving segment 127 of the amount differential mechanism, thus setting the amount differential mechanism into a position commensurate with the value read from the card.

The amount differential mechanism thereby sets the printing mechanism in a manner well known in the art, through the beam 149, the link 152, and the segment arm 156.

A stop member similar to the stop member 194 is provided in connection with the auxiliary differential mechanism for the control rows. This is operable to control the control differential mechanism to set said differential mechanism according to the information picked up from the appropriate magnetic strip 53 on the ledger card 51.

The auxiliary differential mechanism and the stop arm 194 are restored to their normal positions after the proper entries have been made. For a further description of the construction and operation of the auxiliary differential mechanism, reference may be had to the previously-cited United States patent application Serial No. 610,754.

*Fee Counters*

The fee counters 220, which are utilized in the present invention to provide an automatic entry of a predetermined amount in an operation following certain types of operations of the accounting machine, are shown in FIGS. 1, 4, 5, 6, 7, and 25.

In the present embodiment of the invention, fee counters 220 are shown provided for only the units, tens, and hundreds amount banks, since this is expected to be adequate in capacity for any service charge to be made on an account. However, it will be realized that the invention is not so limited, and that fee counters could be provided for any desired number of amount banks.

All of the fee counters for the various denominations are rotatably mounted on a shaft 221 and are arranged with respect to the corresponding differential actuators 115 to be constantly engaged with said actuators, so that movement of the actuators 115 results in corresponding movement of the counters 220.

Each fee counter 220 includes a sleeve 222, mounted free on the shaft 221 and retained in position by clips 223 and 224. The clip 223 is fixed to the shaft 221 at one end of the sleeve 222, while the clip 224 is spaced from the other end of the sleeve 222 a sufficient distance to permit an arm 225 to be mounted on the shaft 221 between the clip 224 and the sleeve 222. Rigidly secured to reduced end portions of the sleeve 222 in the same relative position with respect to each other are two gear members 226 and 227, each having nine short teeth 228 and one long tooth 229.

Rotatably mounted on the sleeve 222 are a gear member 230, which is substantially thicker than either of the members 226 or 227, and a spacer 231. The spacer 231 is positioned between the members 226 and 230 to provide a slot therebetween. A second slot, 232, is cut into the member 230 to separate each gear tooth of said member into two sections.

A stud 233 is fixed in the arm 225 in a position to extend between the teeth of the member 227 and also between the teeth of the adjacent section of the member 230 to maintain the members 227 and 230 in fixed relation to each other. Since the member 226 is fixed with respect to the member 227 by the sleeve 222, it also will be maintained in fixed relation to the member 230. It will be seen that, by withdrawing the stud 233 from the spaces between the teeth of the members 227 and 230, the relationship of the members 226 and 227 to the member 230 may be altered.

As will be described subsequently, the long tooth of the gear members 226 and 230 cooperates with a reset pawl to cause the differential actuator 115 to be set in a position determined by the relationship of the position of the fee counter 220 to the position of the differential actuator 115. The relative position of these two elements therefore determines, in each denomination, the amount of the fee or service charge which will be automatically entered during a fee operation by the fee counter 220 of that denomination. Since the fee or service charge to be applied to the accounts of the business organization utilizing the accounting machine of the present invention may be changed from time to time, it is desirable to be able to alter the relationship of each fee counter 220 to its corresponding differential actuator 115.

It is also seen by examination of FIGS. 4 to 7 inclusive of the drawings that the members 226 and 227, coupled together by the sleeve 222, may have a different relationship to the differential actuator 115 from that of the member 230, and that this relationship between the members 226 and 227, on the one hand, and the member 230, on the other hand, may be altered by withdrawal of the stud 233 from the space between the teeth of the members 227 and 230 and the consequent shifting of these members with respect to each other.

In the illustrated embodiment of the invention, the members 226 and 227 are set with respect to the corresponding differential actuator 115 in the various denominations to provide the fee which is used in connection with check and deposit entries to various accounts. The member 230 is set with respect to the differential actuator 115 to provide the periodic fee which may be applied at stated intervals, such as one month, for example, to all of the accounts being serviced.

Figure 6:
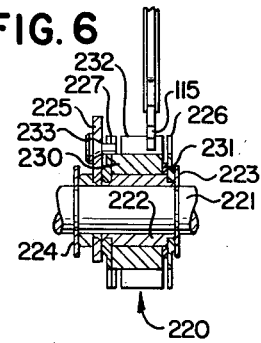
FIG. 6 is an enlarged fragmentary sectional view showing the details of construction of a fee counter and the manner in which it cooperates with its associated differential mechanism.
Figure 7:
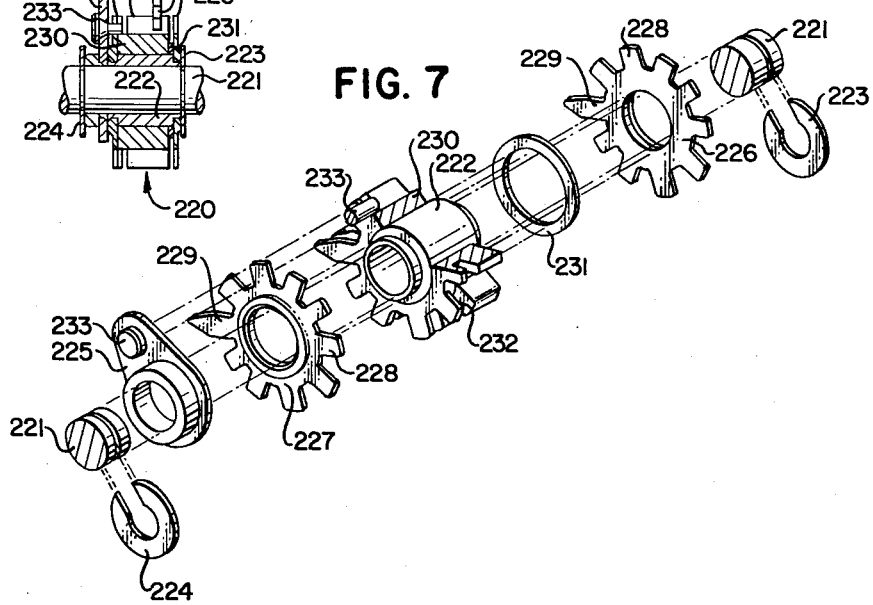
FIG. 7 is an exploded view, showing the various components of one of the fee counters employed in the accounting machine of the present invention.

When it is desired to change the amount of the check and deposit fee in any denomination, the clip 224 for the fee counter 220 of that denomination is withdrawn from the shaft 221, and the arm 225, with its stud 233, is shifted to the left, as viewed in FIG. 6. Once this is done, it is apparent that the members 226 and 227 may be shifted with respect to the member 230, which is held in position by its engagement with the differential actuator 115. On the other hand, when it is desired to change the amount of the periodic fee, the shaft 221, with its associated fee counters, is shifted to the right, as viewed in FIG. 6, to a position in which an aliner (not shown) will engage the member 226. In this position, the slot 232 is alined with the differential actuator 115, so that the member 230 may be rotated with respect to the member 226, and also with respect to the differential actuator 115. Changing of the amount of the periodic fee for each denomination may thus be readily effected.

The manner in which the shaft 221 with its fee counters 220 may be shifted along its longitudinal axis to cause the entry of the proper amount of the fee in either a check operation or a deposit operation, or in a periodic fee operation, will be described subsequently.

*Fee Counter Shifting Means*

Manually-operable means, shown in FIGS. 3, 8, 9, and 10, are provided for shifting the fee counters 220 in accordance with the type of fee program which is selected.

The fee program selector, shown generally at 78, is pivotally mounted on the tie rod 120 adjacent the left side frame 109 of the accounting machine. An arm 241 of the selector 78 has fixed to its lower end a sleeve 242, which is bored to receive a member 243, mounted on the tie rod 120.

A lock cylinder 244, having an actuator 245, is provided on the fee program selector 78 to enable said selector to be locked in any one of its four positions. The actuator 245 cooperates with one end of a lever 246, pivotally mounted on the arm 241 and urged clockwise, as viewed in FIG. 8, by a spring 247. Fixed in the other end of the lever 246 is a stud 248, which cooperates with notches in a member 249, fixed to the machine framework. It will be seen that, when the lock cylinder 244 is operated so that its actuator 245 is locked in the position shown in FIG. 8, the lever 246 is blocked against counter-clockwise movement, and the stud 248 therefore cannot be moved from the notch in the member 249 in which it is engaged. This retains the fee program selector 78 against movement out of the position in which it has been locked by the cylinder 244.

On the other hand, when the lock cylinder 244 is unlocked, the actuator 245 is shifted to a position in which it does not block counter-clockwise movement of the lever 246. The fee program selector 78 may then be shifted from the position in which it is shown in FIG. 8 to another position, since the surfaces on the notches on the member 249 will cam the stud 248 out of said notches during shifting movement of the fee program selector 78, due to the fact that the lever 246 is free to rock counter-clockwise about its pivot point.

Interlock means are provided to prevent shifting of the fee program selector 78 while the accounting machine is operating, and also to prevent operation of the accounting machine when the fee program selector 78 has not been set correctly in one of the four available positions. A series of notches 250 are arranged on an extension of the fee program selector 78 to engage with a hooked end on an arm 251 fixed to the key lock shaft 252 of the accounting machine. Since the key lock shaft 252 rocks clockwise, as viewed in FIG. 8, during each cycle of machine operation, the hooked end on the arm 251 will be positioned in one of the notches 250, or adjacent the right end of the extension of the selector 78, during each cycle of machine operation. This effectively prevents movement of the fee program selector 78 while an accounting machine operation is going on. It will also be seen that, in the event that the selector 78 has been incorrectly set to a location between two of its regular positions, a high portion on the extension will be positioned opposite the hooked end of the arm 251. In such case, when the accounting machine commences operation, the hooked end on the arm 251 will engage such high portion and prevent full movement of the key lock shaft 252, which in turn will prevent further operation of the accounting machine.

Means are provided for shifting the shaft 221 of the fee counter line along its longitudinal axis to position the fee counters properly in accordance with the setting of the fee program selector 78. Such means include a link 255, which is pivotally connected at one end to the arm 241 of the program selector 78, and which is pivotally connected at its other end to an arm 256, integral with a gear sector 257, which is pivotally mounted on a stud 258, secured to the machine framework. Teeth on the sector 257 mesh with teeth on a companion sector 259, fixed to a shaft 260, journaled in the machine framework. Also fixed to the shaft 260 is an arm 261, provided with a slot 262 at its free end. A stud 263 extends through the slot 262 and through a spacing sleeve 264 and is fixed in a slide 265. Slots 266 and 267 on the slide 265 cooperate with studs 268 and 269, secured to supports 270 and 271, which are in turn secured to the machine framework, to mount said slide 265 for reciprocating movement under control of the arm 261. As best shown in FIG. 10, the slide 265 includes an upper portion 272, having therein a slotted track 273, which accommodates a stud 274 in a block 275, which is fixed to the shaft 221.

Examination of FIGS. 8, 9, and 10 shows that movement of the fee program selector 78 is transmitted to the slide 265 to position said slide in accordance with the position of the selector 78. This in turn sets the slotted track 273 to a corresponding position and, in so doing, acts through the stud 274 to shift the fee counter shaft 221. The position of the fee counters 220 with respect to the differential actuators 115 is thus controlled through the above linkage by the fee program selector 78.

It will be noted that, when the fee program selector 78 is in position 1, in which an automatic fee operation is to be performed following each check entry, and when the selector 78 is in position 2, in which an automatic fee operation is to be performed following each check or deposit entry, the gear member 226 of each counter 220 is positioned in the path of movement of a reset pawl 402 (FIG. 25), so that the long tooth thereon can effect an automatic fee entry, in a manner which will be described subsequently. When the fee program selector is in position 4, where a periodic fee operation is to be made following a balance pickup operation of the accounting machine, the member 230 of each of the various fee counters is positioned in the path of movement of the reset pawl 402 (FIG. 25), so that the long tooth thereon can effect an automatic fee entry, in a manner which will be described subsequently.

Counter-Shifting Control Switch

In addition to effecting shifting of the fee counters 220, the fee program selector 78 also controls the setting of a switch SR2 (FIGS. 17 and 18) for controlling certain functions in the operating circuitry of the accounting machine, as will be described subsequently.

As shown in FIG. 17, the shaft 260 extends beyond the left side frame 109 and an additional frame 281, and is provided with a slot 282 in its end. Engaging the slot 282 is a projection 283 on a stub shaft 284 fixed to the wiper member 285 of the switch SR2. Said switch is fixed to a member 286, which in turn is secured to the frame 281 by a plurality of spacing members 287.

The wiper member 285 is provided with three wiper arms 288 to engage three sets or levels of four contacts each in the switch SR2. This enables three different control functions to be obtained in the operating circuitry from each setting of the fee program selector 78. Each of the three sets includes a common 289 and four contacts 290, one for each position of the selector 78. Each wiper arm 288 provides a bridge from the common 289 to one of the contacts 290 in each position of the selector 78. Terminals 291 are provided for connecting the various elements of the switch SR2 to the remainder of the operating circuitry of the accounting machine.

Solenoid Control of Front Reset Shaft and Zero Stop Levers

A solenoid L11 (FIG. 19) is fixed in the machine framework and is energized at selected times to effect certain accounting machine functions. The plunger of the solenoid L11 is pivotally connected to one end of a link 301, the other end of which is pivotally connected to an arm 302 rotatably mounted in the machine framework and urged in a clockwise direction by a spring 303.

A second arm 304, integral with the arm 302, is provided at one end with a stud 305, which engages a slot 306 in a link 307 pivotally connected to an arm 308 fixed to the front reset shaft 309. A notch 310 in the upper edge of the link 307 is arranged to engage a stud 311 fixed to an accounting machine support member 312 when the link 307 is in one position. A slot 313 and an adjacent shoulder 314 are arranged to engage a stud 315, fixed to a cam follower 316, when the link 307 is in another position.

The cam follower 316 is pivotally mounted on a shaft 317, mounted in the machine framework, and is provided with a pair of rollers 318 and 319, arranged to engage the peripheries of a pair of cams 320 and 321, respectively, fixed to the main cam shaft 108.

Also fixed to the front reset shaft 309 is an arm 323, to which is pivotally connected one end of a link 324. Pivotally connected to the other end of the link 324 is one arm of a lever 325, rotatably mounted on a stud 326, which is secured in the machine framework. The other arm 327 of the lever 325 is provided with a surface 328 arranged to engage a stud 329 fixed on a zero stop lever 330. One zero stop lever 330 is provided for each of the units, tens, and hundreds amount banks of the accounting machine, and linkage identical to that described above connects each of said zero stop levers with the front reset shaft 309. Each of the zero stop levers 330 is pivotally mounted on the frame 331 of its associated key bank by a stud 332.

The mechanism described in FIG. 19 operates in the following manner. Energization of the solenoid L11 acts through the link 301 and the arms 302 and 304 to shift the link 307 from the position in which it is shown in FIG. 19, and in which it is retained against movement by engagement of the notch 310 with the stud 311, downwardly, so that the slot 313 is engaged with the stud 315 on the cam follower 316. The cams 320 and 321 are rotated by the shaft 108 during the ensuing cycle of accounting machine operation. The cam follower 316 is first rocked counter-clockwise, thus rocking the front reset shaft 309 counter-clockwise.

As will be described subsequently, the front reset shaft 309 operates various mechanisms of the accounting machine. Included in such mechanisms are the zero stop levers 330 for the various key banks, which are shifted counter-clockwise, out of operative position, by the action of the lever 325, which is rocked counter-clockwise due to the movement of the toggle consisting of the arm 323 and the link 324.

Subsequently, the cam follower 316 is rocked clockwise, by the cams 320 and 321, back to the position in which it is shown in FIG. 19. At this time, the link 307 also is returned to the position in which it is shown in FIG. 19, by engagement of the stud 315 with the shoulder 314, thus returning the front reset shaft 309 and its associated mechanisms to their original positions.

Subsequently, deenergization of the solenoid L11 permits return of the link 307 to the position in which it is shown in FIG. 19, wherein the notch 310 engages the stud 311, due to the action of the spring 303.

Control Row 2 Positioning Means

Automatic means, shown in FIGS. 22, 23, and 24, are provided to set control row 2 of the accounting machine for intiation of the proper type of fee or fee correction operation following certain manually-initiated machine operations.

As previously described, the segments 153 (FIGS. 1 and 22) associated with the differential mechanisms for the various key banks of the accounting machine are positioned according to the settings of certain mechanisms. These segments then remain in the position to which they are set until the differential mechanisms are repositioned in the next machine operation.

Associated with the segment 153 of control row 2 for movement in unison therewith is an arm 340, to which is pivotally connected one end of a link 341, the other end of which is pivotally connected to a selecting plate 342 rotatably mounted on the tie rod 120 adjacent the differential mechanism for control row 2. The periphery of the plate 342 is provided with a plurality of surfaces, such as 343 and 344, of varying distances from the center of rotation of said plate.

The periphery of the selecting plate 342 is sensed during certain cycles of operation of the accounting machine by a stud 345 (FIGS. 22 and 23) fixed in one arm of a lever 346 rotatably mounted on a shaft 347 supported in the machine framework. The lever 346 is urged counter-clockwise by a spring 348, which is coiled about the shaft 347, has one end engaging the lever 346, and has its other end bearing on a fixed stud 349. The lever is normally retained against movement under the influence of the spring 348 by engagement of the stud 350 in the other arm of the lever 346 with one end of a slot 351 in a link 352, which is pivotally connected at its other end to an arm 353 fixed on the front reset shaft 309.

Also pivotally mounted on the shaft 347 and flexibly connected to the lever 346 by a spring 354 is an arm 355, which has mounted on its free end a triangular stud 356 (FIG. 24). The stud 356 is so arranged that, by rocking of the arm 355, it can be shifted into the path of movement of one of a plurality of hook-like projections 357 or 358 formed on the periphery of a row 2 control plate 360, which is rotatably mounted on a sleeve 361 on the tie rod 120. A projection 359 is also provided on the plate 360 to cooperate with an overdraft control mechanism (not shown), which is effective when an overdraft condition exists.

The plate 360 includes an arm 362, having therein a slot 363, within which is located a stud 364, fixed to a forward extension of a bell crank 365, pivotally mounted on an extension of the differential actuator (not shown) of control row 2. Carried by the vertical arm of the bell crank 365 is a stud 366, on which is pivoted a link 367. The link 367 is also pivoted to the upper end of a latch 368, pivotally mounted on the differential actuator (not shown) of control row 2. The latch 368 has a foot 369, normally held in contact with the periphery of a driving segment, which is not shown herein but which is of the same type as the segment shown at 127 in FIG. 1 for the amount row.

Operation of the control row 2 positioning means will now be described.

During a normally-initiated operation of the accounting machine, such as, for example, a check-posting operation, the segment 153 is set by the differential mechanism of control row 2 to a position corresponding to the check key 68 which is depressed in said row. This is effective, through the arm 340 and the link 341, to position the selecting plate 342 correspondingly.

Near the end of the check-posting cycle of the accounting machine, in a manner which will be described subsequently, the solenoid L11 is energized. This shifts the link 307, as has been previously described, to a position in which the slot 313 is engaged with the stud 315 on the cam follower 316.

At the beginning of the following automatically initiated operation of the accounting machine, the cams 320 and 321 (FIG. 19) rock the cam follower 316, which motion is transmitted through the link 307 and the arm 308 to the front reset shaft 309. The arm 353 (FIG. 22), which is fixed to the shaft 309, is accordingly rocked counter-clockwise, shifting the link 352 upwardly. This frees the stud 350 and the lever 346 for movement, under the influence of the spring 348, so that the stud 345 moves to the right, as viewed in FIG. 22, to sense the periphery of the selecting plate 342. The position of the stud 345 and the lever 346 is thus determined by whether a high portion 343 or a low portion 344 on the plate 342 is positioned opposite the stud 345. Setting of the stud 345 is also effective, through the spring 354, to set the arm 355, having the triangular stud 356 (FIG. 24) fixed therein.

As the automatically-initiated operation of the accounting machine commences, the differential mechanism for control row 2 commences a clockwise rotation, carrying with it the plate 360, which is free to continue movement until one of the hook-like projections 357 or 358 thereon engages the triangular stud 356 to halt movement of the plate 360.

The plate 360, during its clockwise movement, carries with it the bell crank 365, the link 367, and the latch 368. When movement of the plate 360 is halted, the bell crank 365 is rocked and acts through the link 367 to disengage the foot 369 of the latch 368 to position the differential actuator (not shown) of control row 2 in a well-known manner. It will thus be seen that the type of automatically-actuated machine operation is dependent upon the setting of control row 2 in the previous normally-initiated operation and upon the initiation of operation of the solenoid L11.

If the preceding operation has been one, such as a check-posting operation, a deposit-posting operation, or a balance-pickup operation (when the fee program selector 78 is in position No. 4), in which a fee is to be charged to the account being posted, then the stud 356 is so positioned as to engage the projection 357 on the plate 360 to break out the row 2 differential mechanism in "fee" position, and cause the predetermined amount stored in the fee counters 220 to be added to the fee totalizer and subtracted from the balance totalizer. On the other hand, if the preceding operation has been one, such as a check-correction operation or a deposit-correction operation, in which a fee correction is to be credited to the account being posted, then the stud 356 is so positioned as to engage the projection 358 on the plate 360 to break out the row 2 differential mechanism in "fee correction" position and cause the predetermined amount stored in the fee counter 220 to be added to the fee correction totalizer and also to be added to the balance totalizer. The manner in which the row 2 differential mechanism functions in carrying out these adding and subtracting operations is fully described in the Bernis M. Shipley United States Patent No. 1,619,796, issued March 1, 1927.

*Row 2 Indication Switch*

Shown in FIGS. 14, 15, and 16 is a multiple-position switch SR3, the setting of which is determined by the positioning of control row 2. The switch SR3 controls certain functions in the operating circuitry of the accounting machine, as will be described subsequently, and is mounted on a support member 376 of the machine framework by means of a stud 377 and a further fastening member 378, which extends through a central aperture in said switch.

The shaft 162, which is controlled by the row 2 differential mechanism, extends through the support member 376. Fixed on said shaft near its end is a gear segment 379, which meshes with a pinion 380. The pinion 380 is provided with an integral stud shaft 381, on which is fixed a wiper 382 for the switch SR3.

The wiper 382 includes a pair of annular members 383, made of electrically-conductive material, each member 383 including two projecting elements 384 and 385.

Either one or the other of the pairs of the elements 384 and 385 is always in engagement with both sides of a common 386 of the switch SR3, while the other element engages both sides of one of a plurality of contacts 387 according to the setting of the switch. The common 386 and the contacts 387 are maintained in fixed position with respect to each other by means of a frame 388. Terminals 389 and 390 are provided for the common 386 and the contacts 387 to enable the switch SR3 to be connected to the operating circuitry of the accounting machine.

The manner in which the setting of the switch SR3 is controlled is believed to be obvious. The gear segment 379 is set according to the position of the row 2 differential mechanism and in turn controls the setting of the pinion 380, to which the wiper 382 is fixed. Accordingly, a circuit is completed through the switch SR3 from the common 386 to the contact 387 which corresponds to the setting of the row 2 differential mechanism.

*Automatic Fee Entry*

The mechanism by which an amount preset in the fee counters 220 is entered into the corresponding amount differential mechanisms is shown in FIG. 25 and will now be described.

It will be recalled that the various fee counters 220 on the shaft 221 are normally engaged with their corresponding differential actuators 115. The teeth of the actuators 115 are of sufficient depth that the long tooth on each of the fee counters 220 can mesh therewith without interrupting movement of the counter with respect to the actuator.

A gear segment 400 is fixed to the front reset shaft 309 so that its teeth mesh with the teeth on a reset segment 401 pivotally mounted on a reset pawl 402, having at one end a projection 403 for engaging a long tooth of the fee counter 220 with which it is associated, and being pivotally connected at its other end to a link 404, which in turn is connected at its other end by a stud 405 to a second link 406. The link 405 engages a notch 407 at the end of the segment 401. The second link 406 in turn is pivotally connected to a reset spider stop arm 408 mounted for rotatable movement on a stud 409 in the machine framework. Mounted for pivotal movement on the arm 408 is a reset spider stop arm pawl 410, which is normally urged clockwise, as viewed in FIG. 25, by a spring 411 secured to one end of said pawl. A stud 412 in the arm 408 limits the movement of the pawl 410 with respect to the arm 408 under the influence of the spring 411, which is also effective to urge the arm 408 against a stud 413 in the machine framework.

Setting of the amount differential mechanisms under control of the corresponding fee counters 220 is accomplished by counter-clockwise rocking of the front reset shaft 309 under control of the solenoid L11 and the cams 320 and 321 (FIG. 19) in the manner previously described. When the front reset shaft 309 is rocked counter-clockwise, a toggle, made up of one arm of the reset pawl 402 and the link 404, is operated, by shifting of the segment 401. This shifts the projection 403 on the pawl 402 into the path of movement of the long tooth of the counter 220 with which it has been alined by the setting of the fee program selector 78. Since the counter 220 is engaged with the differential actuator 115 of the differential mechanism, it is rotated in unison with the movement of said differential mechanism. As a consequence, the reset spider 114 will have made a certain incremental movement by the time the long tooth of the counter 220 engages the projection 403 of the pawl 402.

The movement imparted to the pawl 402 by the long tooth of the counter 220 is transmitted through the link 406 to the stop arm 408 to rock said stop arm clockwise about the stud 409 against the force of the spring 411, so that the pawl 410 is moved into engagement with one of the internal teeth on the reset spider 114, thus halting movement of said reset spider and establishing the position of the differential mechanism in a well-known manner. These settings of the differential mechanisms of the units, tens, and hundreds amount banks effect the entry of the predetermined fee amount.

The subsequent deenergization of the solenoid L11 and the return movement of the shaft 309 permit repositioning of the differential mechanism in the normal sequence of operation of the accounting machine.

*Disabling of Check Count Mechanism*

The check count mechanism, partially shown in FIG. 20, must be disabled during an automatic fee operation, in order to prevent an improper operation at such time. Means associated with the check count mechanism are provided for accomplishing this, and are shown in FIG. 21.

The banks of check count keys 64 (FIG. 3) are similar in construction to the amount banks, and each has a differential mechanism which is similar to, and functions in exactly the same manner as, the differential mechanism for the amount bank shown in FIG. 1. The spider 421 for the units check count bank has a stud 422, with a plurality of flat surfaces thereon, which is adapted to cooperate with a zero stop surface 423, and with a surface 424 corresponding to the "1" position of the units differential mechanism, on a zero stop pawl 425 free on a shaft 426 journaled in the machine framework. A torsion spring 427, which encircles the shaft 426 and opposite ends of which engage a stud 428 in the stop pawl 425 and a bushing on a rod 429, urges said stop pawl clockwise to normally maintain a tail 430 thereon in contact with a bushing on said rod 429.

The stud 428 carried by the zero stop pawl 425 for the units check count bank overlies and cooperates with a lever 431 integral with a finger 432 and free on the rod 429. The finger 432 cooperates with a stud 434 in an upward extension of an arm 435 free on a stud 436 in the key bank framework. The arm 435 has an extending finger 437, which cooperates with a rod 438 supported by a plurality of cranks 439 secured on the zero pawl throwout shaft 118 (see also FIG. 1).

The stud 434 in the arm 435 also cooperates with a camming surface on a lever 445 pivoted on a stud 446 secured in the unit check count key frame. Loosely connected to the lever 445 is a lever-operating bar 447, the upper end of which is linked in a similar manner to the key frame, so that said bar may be shifted. The bar 447 has a plurality of camming surfaces 448 thereon, which cooperate, respectively, with studs 449 in the stems of each of the unit check count keys 64.

Depression of one of the units keys 64 causes the stud 449, in cooperation with the camming surface 448 to shift the bar 447 downwardly to rock the lever 445 clockwise. Clockwise movement of the lever 445 causes the camming surface thereon, in cooperation with the stud 434, to rock the finger 432, the hub 433, and the lever 431 counter-clockwise. Counter-clockwise movement of the lever 431 is transmitted through the stud 428 to the zero stop pawl 425 to rock said pawl to move both the "0" surface 423 and "1" surface 424 out of the path of the stud 422, so that the spider 421 and the associated differential mechanism will be positioned under the influence of the depressed key 64.

In total- and sub-total-printing operations, the shaft 118 is rocked clockwise, which movement is imparted to the cranks 439 and the rod 438, causing said rod to engage the finger 437 of the arm 435 to rock said arm counter-clockwise. Counter-clockwise movement of the arm 435, by means of the stud 434, rocks the finger 432 and the lever 431 counter-clockwise in unison therewith. Counter-clockwise movement of the lever 431 is transmitted through the stud 428 to the stop pawl 425 to rock said pawl to ineffective position, as explained above, so that the total number of checks may be recorded.

The lever 431 for the units check count key bank has an L-shaped slot 450, through which extends a stud 451, said stud also being adapted to cooperate with a projection 452 on the zero stop pawl 425. The stud 451 is secured to a crank 453 on the shaft 426. The shaft 426, which extends the full length of the machine, has secured near its right-hand end a crank 454 (FIG. 21) connected by a link 455 to a control segment 456 for the row 2 transaction keys, said segment rotatably supported on a bushing 457 on the tie rod 120. A spring 458 urges the segment 456 clockwise to maintain a camming surface 459 thereon in contact with a stud 460 in one arm of a yoke 461 free on a rod 462 supported by the key bank support plates. The yoke 461 is connected by a link 463 to a crank 464 secured to the key lock shaft 252.

Also fixed to the shaft 426 is an arm 465, having secured to its free end a stud 466. The stud 466 rides in a slot 467 in an arm 468 pivotally connected to an arm 469 secured to the front reset shaft 309.

Clockwise movement of the key lock shaft 252 (FIG. 21) when the machine is released for operation, through the link 463, rocks the yoke 461 counter-clockwise to move the stud 460 away from the raised portion of the cam surface 459 to permit the spring 458 to yieldingly urge the segment 456 clockwise. Each of the following row 2 transaction keys 68—Overdraft Pickup, Fee, Deposit Correction, Analysis, Deposit, and Fee Correction— has therein a stud 470, which, when any one of said keys is depressed, is adapted to move into engagement with the corresponding surface 471 in the peripheral surface of the segment 456 to obstruct clockwise movement of said segment by the spring 458 when the key lock shaft 252 is rocked clockwise upon release of the machine for operation. Similarly, the Balance Pickup key has a stud 470, which moves into the path of a shoulder 472 on the right-hand end of the peripheral portion of the segment 456 to obstruct clockwise movement of said segment. Consequently, when any one of the keys just named is depressed, the segment 456 will be rendered inoperative.

The row 2 Check key 68 has therein a stud 470 adapted to cooperate with a notch 473 in the peripheral surface of the segment 456, said notch 473 being substantially larger than the notches cooperating with the previously-named row 2 transaction keys, thus providing enough clearance between the left-hand, or lower, wall of said notch and the stud 470 in the Check key 68 to permit partial movement of the segment 456 under the influence of the spring 458 when the key lock shaft 252 is rocked at the beginning of machine operation. This partial clockwise movement of the segment 456, through the link 455, rocks the crank 454, the shaft 426 (FIGS. 20 and 21), the crank 453, and the stud 451 counter-clockwise a sufficient distance to cause said stud 451, in co-operation with the extension 452 of the zero stop pawl 425, to rock said pawl counter-clockwise, against the action of the spring 427, to move the "0" stop surface 423 thereon out of the path of the stud 422 and to move the "1" stop surface 424 into the path of said stud, so that, upon machine operation, when the Check key 68 is depressed, the differential mechanism for the unit check count keys 64, including the spider 421, will be moved to "1" position under the influence of the surface 424 instead of being stopped in zero position. This permits "1" to be added automatically into the check count totalizer.

The Check Correction key 68 of row 2 is used for correcting a check or debit item which was erroneously entered in a previous operation, and, since such a previously-entered check, which is being cancelled in the present operation, was automatically counted by the check count mechanism, it is necessary to subtract "1" from the check count wheels when a check correction operation is performed.

It will be noted that a large notch 474 is cut out of the periphery of the segment 456 opposite the position where the stud 470 of the Check Correction key may be depressed to engage such segment. The notch 474 is of such extent that depression of the Check Correction key permits full clockwise movement of the segment 456 upon release of the machine for operation, and this full movement is imparted to the shaft 426, the crank 453, and the stud 451 (FIG. 20) to rock the zero stop pawl 425 for the units check count keys 64 full distance to move both surfaces 423 and 424 out of the path of the stud 422. Full movement of the shaft 426 also moves the zero stop pawls (not shown) for the remaining orders of the check-counting banks out of the path of the studs corresponding to the stud 422 in the units order. This frees the differential mechanisms for all of the check count banks for full movement to the "9" position to cause the complementary figure "9999" to be added in the check counting wheels, which, in effect, is the same as subtracting "1" from said wheels.

Depression of any one of the units check count keys 64 (FIG. 20) causes the stud 449 therein, in cooperation with the camming surface 448 on the control bar 447, to rock the lever 445 clockwise, causing the camming surface thereon, through the stud 434 and the finger 432, to rock the lever 431 counter-clockwise to move the vertical branch of the L-shaped slot 450 in said arm over the stud 451 to block movement of the shaft 426, thereby disabling the automatic check count mechanism when a unit check count key 64 is depressed. Similar mechanism (not shown herein) is provided for the other banks of the check-counting section of the keyboard.

It is also necessary to provide means for disabling the check count mechanism during an automatic fee operation, since, if this were not done, the check count mechanism would function to subtract "1" from the check count, due to the fact that no row 2 keys would be depressed in such an automatic operation, and the check count differential mechanisms would accordingly go to their "9" positions. Such disabling means has already been briefly described, and functions in the following manner. When the solenoid L11 is energized, it is effective to shift the link 307 clockwise, as viewed in FIG. 19, so that the slot 313 is positioned over the stud 315 on the cam follower 316, and the shaft 309 is then subsequently rocked by the action of the cams 320 and 321 in a counter-clockwise direction, as has previously been described.

Such counter-clockwise movement is transmitted through the arm 469 to position the arm 468 so that the upper portion of the slot 467 in said arm is located with relation to the stud 466 in the arm 465 to prevent counter-clockwise movement of said arm. Since the arm 465 is fixed to the shaft 426, counter-clockwise movement of the shaft 426 is consequently also prevented, and therefore the zero stop pawl 425 will remain in the position in which it is shown in FIG. 20 and will block the movement of the spider 421 to prevent the subtraction of "1" from the check count.

For a more detailed illustration and description of the check count mechanism, reference may be had to the United States patent to Pascal Spurlino et al., No. 2,375,594, issued May 8, 1945.

*Automatic Selection Control Mechanism*

Since there are both "check" and "fee" columns on the ledger card 51 to receive printed entries of debits, it is necessary to control the operation of the printing hammers for the various columns, to cause alternating printing of "check" and "fee" items, and to coordinate the feeding of the ledger card with the printing operations while such debits are being entered.

In order to control such feeding of the carriage and also to control the alternate operation of the hammers, there is provided an automatic mechanism, shown in FIGS. 11, 12, and 13, to drive the selecting disks of selecting control units, as determined by the keys 68 and 69 of the control rows 1 and 2.

To effect this control, there is provided a notched disk for each of the hammers, comprising alternating high and low spots, for printing in the various columns, and also a notched disk in conjunction with the carriage feed control. These disks, and the manner in which they function to control printing and feeding, are fully shown and described in the United States patent to Pascal Spurlino et al., No. 2,373,510, issued April 10, 1945. For a more detailed illustration and description of these control plates, reference may be had to that patent.

The means for controlling the operation of the automatic means, described above, by the row 1 keys 69 is through a shaft 481 (FIG. 13). The shaft 481 is operated from the row 1 differential mechanism, in the manner fully described in the above-mentioned Spurlino et al. patent. The shaft 481 has mounted thereon a pinion 482, which drives a ring gear 483, meshing with a gear 484, mounted on a stud 485. Secured to the gear 484 is a feed pawl control disk 486, which coacts with a pin 487 on a slide 488 (FIG. 12). The slide 488 is mounted to slide freely on a hub or collar 489 on the stud 485, and also on a collar 490 on a shaft 491. Force of gravity maintains the slide 488 in its lowered position, with the pin 487 in engagement with the control disk 486.

The control disk 486 has shallow feed notches in the first, second, fourth, fifth, and sixth positions, which positions correspond to the positions in which the control disk 486 is positioned in relation to the pin 487 by the New Balance Non-Transfer, Sub-Balance, Sub-Total, Clear Total, and New Balance keys 69; and has a deeper feed notch in its zero position.

A camming device is operable at the proper time to raise the slide 488, so that the disk 486 may be differentially positioned. The camming device includes a cam 494, secured to a printer cam shaft 495. The cam 494 cooperates with a roller 496 on a lever 497, pivoted on the shaft 491 and having at its other end a stud 498 to engage a surface 499 on the slide 488. Also located in the path of movement of the stud 498 is an arm 500 of a switch-operating lever 501 pivotally mounted on a stud 502 fixed in the machine framework and having a projection 503 adapted to engage an actuator of a switch 493, including contacts SC33, said switch being fixed in the machine framework.

Immediately at the beginning of the cycle of machine operation, the cam 494, through the lever 497, raises the slide 488 and holds it in its raised position until the cam shaft 495 has rotated about 210 degrees, at which time the cam 494 releases the lever 497 to permit the slide 488 to fall by gravity, so that the pin 487 can feel for the particular surface of the disk 486 which has been set opposite it under control of the row 1 transaction bank of the accounting machine. During the time that the slide 488 is held in raised position, the switch-operating lever 501 is also held in raised position by engagement of the stud 498 on the lever 497 with the arm 500 on the lever 501. Shifting of the lever 501 to its raised position moves the projection 503 into engagement with the actuator of the switch 493 to open the contacts of said switch. Such movement of the lever 501 also shifts a stud 504 out of engagement with the periphery of a control plate 505, which is set under control of the key depressed in control row 3 of the accounting machine, to permit the setting of the plate 505 during operation of the accounting machine.

The slide 488 has a control surface 506, coacting with a pin 507 on a feed pawl 508, which is pivoted on a lever 509. The lever 509 carries rollers 510 and 511, which cooperate with and are operated by a pair of cams 512 and 513, secured to the printer cam shaft 495. The lever 509 is pivoted on the shaft 491, and the pin 507 is held in contact with the surface 506 by a spring 514. An arm 525 on the switch-operating lever 501 also engages the stud 507 when the lever 501 is in raised position. The feed pawl 508 cooperates with a ratchet 515, having alternate high teeth 516 and low teeth 517, for a purpose to be described hereinafter.

The ratchet 515 is secured to a gear 518, which drives a ring gear 519, which, through its internal teeth, drives a pinion 520 and a square shaft 521. The square shaft 521 is effective, through the well-known internal drive unit and an additional pinion (not shown) to drive selecting plates (not shown) having alternate high and low spots, to control alternating printing in the "check" and "fee" columns of the ledger card 51.

The cams 512 and 513 rock the lever 509 counter-clockwise and consequently retract the pawl 508 at about 150 degrees of rotation of the printer cam shaft 495. This retracting motion is completed at about 210 degrees. Then, at about 290 degrees, the cams 512 and 513 rock the lever 509 clockwise, at which time the adjustment of the notched disk 486 has been completed, and the pawl 508 is moved to the right. At this time, the vertical position of the pawl will have been determined by the sensing of the disk 486 by the pin 487. The pawl 508 will engage either one of the high teeth 516 or one of the low teeth 517, to operate the ratchet wheel 515, which in turn operates the gears 518 and 519 and the square shaft 521, or it may be held above all of the teeth 516 and 517, depending upon the position of the disk 486 set under control of the row 1 bank of keys in all operations.

There is also a disk 522 controlled by the keys of control row 2, through mechanism (not shown) similar to that for controlling the disk 486 by the keys of control row 1. The disk 522 is provided with shallow notches in the positions corresponding to the 0, 1, 2, 5, 7, and 9 positions of the disk, and with deeper notches in the positions corresponding to 4 and 8. If the pin 487 engages the medium-depth notches in the zero, first, second, fifth, or ninth positions, then the pawl 508 will not engage the short teeth 517 of the ratchet 515 but will engage the long teeth 516, to restore said ratchet into a position to effect an automatic feed the next time the automatic feed becomes necessary through the entry of a series of debits.

If the pin 487 engages the deeper notches in the fourth or eighth positions, then the pawl 508 will engage either the long teeth 516 or the short teeth 517, for movement of the ratchet 515.

When the disk 522 is set to the third or sixth positions, into which positions the disk is adjusted under control of the Deposit Correction or Deposit keys, respectively, the pin 487 will be held sufficiently high to cause the surface 506 to hold the pawl 508 high enough so that said pawl, during its reciprocating motion by the lever 509, will miss the high teeth 516.

The intermediate positions 1, 2, 5, 7, and 9 of the control disk 522 always insure that the ratchet 515 is brought back into the position shown, if not already there. In other words, when the pin 487 is in intermediate position, the pawl 508 is lowered sufficiently to catch one of the high teeth 516 and move the ratchet one step, which will restore it to the position shown, if it had been left in another position at the end of a listing of checks.

The plate 505, which is controlled by row 3, is provided with a peripheral configuration such that high spots 523 are provided in positions corresponding to the No. 1, 3, 4, 7, and 9 positions of row 3, related to the Service Charge, Credit Memorandum, Debit Memorandum, List, and No Charge keys of row 3. It will thus be seen that, if any of the above five keys of row 3 are depressed, the plate 505 will be set in the ensuing accounting machine cycle so that a high spot 523 is moved under the stud 504 on the lever 501. This prevents the normal counter-clockwise return movement of the lever 501 to the position in which it is shown in FIG. 12, following the withdrawal of the stud 498 in the lever 497 from engagement with the arm 500. With the lever 501 retained in its raised position, the projection 503 maintains its contact with the actuator of the switch 493 and thus maintains the contacts SC33 in open condition, to prevent a "fee" cycle of accounting machine operation, in a manner which will be described subsequently.

*Key Interlock and Solenoid Control*

An interlock is provided which prevents the accounting machine from being released for operation if any amount, check count, or transaction keys on the keyboard are depressed during a balance pickup cycle of operation or during an automatic "fee" cycle of operation, and which prevents improper functioning of the "new balance" operating circuit. For these purposes, a switch 531 (FIG. 26), containing contacts SC1A1, SC1B1, and SC1B2, is provided. The contacts SC1A1 are effective, in a manner which will be described subsequently, to prevent improper energization of the new balance solenoid L7, when the zero stop throwout shaft of the accounting machine is being oscillated. The contacts SC1B1 are effective, in a manner which is generally described in the previously-mentioned United States patent application, Serial No. 610,754, in a balance pickup operation in which a key is erroneously depressed, to cause a "short cycle," during which the accounting machine carriage will be moved inwardly and then returned immediately to its home position without entering any data into the machine. The contacts SC1B2 are effective, in a manner which will be described subsequently, to prevent initiation of an automatic "fee" operation when any amount, check count, or control keys are depressed.

The contacts SC1A1 of the switch 531, which is fixed to the cross bar 107, are normally held in closed position, and the contacts SC1B1 and SC1B2 are normally held in open position, by an arm 532, secured to the shaft 118, which is the usual zero stop throwout shaft, carried by the frame of the machine. Also secured on the shaft 118 is a bifurcated arm 533, notched to cooperate with a stud 534 on a driving arm 535. The driving arm 535 is provided with a cam edge 536, which is engaged by a pivoted pawl 537, which pawl is held in engagement with the cam edge 536 by a spring 538. The pawl 537 is pivoted on a stud 539 on an arm 540, pivoted on a stud 541, carried by an auxiliary frame 542. The lower end of the arm 540 is provided with a stud 543, by means of which a link 544 is pivotally connected to the arm 540. The right end of the link 544 is pivotally connected by a stud 550 to a cam follower 545, mounted freely on a stud 546 in the machine framework and carrying a roller 547 arranged to engage the periphery of a cam 548 fixed to a shaft 549.

The stud 550, which pivotally connects the link 544 with the cam follower 545, also rides in a slot 551 in one end of a link 552, the other end of which is pivotally connected with the actuator of a solenoid L10 fixed in the machine framework. Between the ends of the link 552 is fixed a stud 553, which is adapted to engage the actuator 554 of a switch 555, which is fixed in the machine framework and which includes the contacts SC34.

When no amount key, check count key, or key of rows 1, 2, or 3 is depressed, and the balance pickup operation is started by depression of the balance pickup bar (not shown), the cam 548 is operated, in a manner which is fully described in the previously-cited United States patent application, Serial No. 610,754, to rock the cam follower 545, which, through the stud 550, forces the link 544 to the right, as viewed in FIG. 26, to rock the arm 540 counter-clockwise. Counter-clockwise movement of the arm 540 carries with it the pawl 537, and the pawl, by its engagement with the cam edge 536, rocks the arm 535 and, through the stud 534, rocks the usual zero stop throwout shaft 118 clockwise, to remove the zero stops and free the differential mechanism to the control of the auxiliary differential mechanism. Clockwise movement of the shaft 118 also rocks the arm 532 from engagement with the actuator of the switch 531, thus permitting the contacts SC1A1 to be opened and the contacts SC1B1 and SC1B2 to be closed. In order to insure that the pawl 537 will rock the arm 535, the initial movement of the pawl 537 and the arm 535 will move the end of the pawl under a block 556 on the frame 542, which block prevents the pawl from being cammed outwardly by the cam edge 536 if too much resistance is encountered during the rocking of the shaft 118.

With the contacts SC1B1 closed, the card carriage will not be returned immediately to its starting position, and the machine will operate through a complete machine operation. With the contacts SC1B2 closed, an automatic "fee" operation is permitted, and, with the contacts SC1A1 open, energization of the new balance solenoid L7 is prevented.

If an amount key 65, a check count key 64, or a key 67, 68, or 69 of control rows 1, 2, or 3 should be depressed when the balance pickup operation is begun, the contacts SC1A1 in the switch 531 are prevented from opening, and the contacts SC1B1 and SC1B2 are prevented from closing, in the following manner.

Each amount bank, each check count bank, and each of the control rows 1, 2, and 3 of keys is provided with a control plate 557, the lower end of which is pivoted on an arm 558, in turn pivoted on a stud 559, carried by a key bank frame 560. When an amount key 65, a check count key 64, or one of the control keys 67, 68, or 69 is moved into depressed position, the corresponding arm 558 is rocked by the corresponding control plate 557 to present a blocking surface 561 in the path of movement of a rod 562, which is carried by a plurality of arms 563, also secured to the shaft 118. The rod 562 is of sufficient length to span all of the arms 558, one of which is provided for each bank of keys. The arm 558, when moved into the path of movement of the rod 562, prevents rocking movement of the shaft 118 and therefore prevents rocking of the arm 532 to operate the contacts SC1A1, SC1B1, and SC1B2 of the switch 531.

Upon rotation of the cam 548 and the rocking of the cam follower 545 thereby, the link 544 rocks the arm 540, but the pawl 537 cannot carry the arm 535 therewith, due to its connection with the arm 533 on the shaft 118, which is prevented from rocking. Therefore, a cam edge on the free end of the pawl 537 is cammed against the cam edge 536, thus causing the pawl 537 to rock out of the notch against the tension of its spring 538. As the pawl 537 is rocked out of engagement with the arm 535, its cam edge moves into contact with the block 556, carried by the auxiliary frame 542.

When the contacts SC1B1 remain in closed positon during a balance pickup operation, the carriage of the accounting machine is immediately brought back to its home position without any data from the ledger card having been entered into the accounting machine. When the cam follower 545 is restored to its home position, the arm 540 is rocked clockwise, and the link 544 is shifted to the left, as viewed in FIG. 26, by a spring 564. During this movement, the pawl 537 again drops into the notch of the member 535 and into contact with the cam edge 536.

During an automatic "fee" operation, it is also necessary, as described above, to insure that no key in any of the amount rows, check count rows, row 1, row 2, or row 3 is depressed, and the contacts SC1B2 in the switch 531 are provided for this purpose. The manner in which these contacts function to control the initiation of an automatic "fee" operation will be described subsequently.

It the case of an automatic "fee" operation, movement of the link 544 to cause rocking of the shaft 118 is effected by energization of the solenoid L10, rather than rotation of the cam 548. As will subsequently be described in the explanation of the operating circuitry, the solenoid L10 is energized near the end of an accounting machine cycle preceding an automatic "fee" cycle of operation. Energization of the solenoid L10 shifts the link 552 to the right, as viewed in FIG. 26, and, through the connection of the stud 550 and the slot 551, also shifts the link 544 to the right. It will be seen that, when no key is depressed, this movement of the link 544 is effective, through the mechanism previously described, to cause operation of the contacts SC1A1, SC1B1, and SC1B2 in the switch 531. On the other hand, when a key in the amount rows, the check count rows, or control rows 1, 2, or 3 is depressed, rotation of the shaft 118 and the arm 532 are prevented, so that the contacts SC1A1, SC1B1, and SC1B2 are not operated.

It will also be seen that, whenever the solenoid L10 is energized, the stud 553 in the link 552 is shifted to the right to move the actuator 554 of the switch 555. This opens the contacts SC34 in the switch 555 and prevents a manual row 2 operation, as will be described subsequently.

Operating Circuitry

The various operating circuits which form a part of the illustrated embodiment of the present invention are shown in FIGS. 27A and 27B. Only so much of the conventional circuitry of the accounting machine in which the present invention is embodied as is necessary to an understanding of said invention is shown. For a detailed description of other parts of the operating circuitry of the accounting machine, reference may be had to the previously-mentioned United States patent application, Serial No. 610,754.

In order to facilitate understanding of the invention, the various operating circuits will be described in accordance with the manner in which they function in performing various types of machine operations. Functioning of the circuitry will first be described for a check-posting operation of the accounting machine. Let it be assumed that the function control knob is set to "Posting I" position, that the fee program selector 78 is set to its No. 1, or "check fee," position, and that the Check key 68 of row 2 has been depressed. This initiates a check-posting operation of the accounting machine.

At the beginning of the check-posting operation, the zero stop throwout shaft contacts SC1B2 (FIG. 27B) are open. The contacts SC943A1 (FIG. 27B), which are closed in home position of the accounting machine, open at 15 degrees in the cycle of operation to interrupt the energizing circuit for the fee relay K320. At about 325 degrees of the check-posting cycle of accounting machine operation, the contacts SC933A1 (FIG. 27A) close, thus completing an energizing circuit for the key interlock solenoid L10, which circuit extends from a first A.C. line 570 over the contacts SC31A1, which remain closed so long as the row 1 differential mechanism is in zero position; the solenoid L10; the contacts SC33B1, which are controlled by the position of the row 3 differential mechanism; points 577 and 578; the No. 1 position of level A of the switch SR2, shown in FIG. 27B as SR2A; the No. 4, or "check," position of the row 2 indication switch SR3; the "Posting I" position of the function control switch SR1D, points 572 and 573; the contacts SC11B1 (FIG. 27A), which are closed except when the step cam is in home position; a point 581; the relay contacts K308AC2, which are closed due to energization of the gate check relay K308, except when a gate check failure occurs; a point 580; the relay contacts K311B2; the relay contacts K301A2; the relay contacts K304B3; the cam-operated contacts SC933A1, referred to above; the cam-operated contacts SC15B2; the cam-operated contacts SC913A1; the key release contacts SC12B1, which are closed except when the key release lever is depressed; and the cam-operated contacts SC3A1, to the other A.C. line 571.

Energization of the solenoid L10 is effective to cause oscillation of the zero stop throwout shaft 118 (FIG. 26), in the manner previously described, to close the contacts SC1B2 (FIG. 27B). At 350 degrees of the cycle of accounting machine operation, the contacts SC943A1 (FIG. 27B) close, to complete an energizing circuit for the fee relay K320. This circuit extends from the A.C. line 570 over the contacts SC31A1; SC943A1; the fee relay K320; the contacts SC1B2; the point 578; the No. 1 position of the switch SR2A; the No. 4, or "check," position of the row 2 indication switch SR3; the "Posting I" position of the switch SR1B; the point 572; the point 573; the contacts SC11B1; the point 581; the contacts K308AC2; the point 580; the contacts K311B2; K301A2; K304B3; SC933A1; SC15B2; SC913A1; SC12B1; and SC3A1, to the other A.C. line 571.

Energization of the solenoid L10 is also effective, in the manner previously described in connection with the mechanism shown in FIG. 26, to open the contacts SC34 (FIG. 27A). This disables an energizing circuit for the relay K307 and thus prevents a manual row 2 operation from taking place following the check-posting operation of the accounting machine.

When the relay K320 is energized near the end of the check-posting cycle of the accounting machine, the contacts K320A2 in the energizing circuit for the fee solenoid L11 are closed, to complete a path which extends from the A.C. line 570 over the solenoid L11 and the contacts K320A2 to the other A.C. line 571, thereby energizing the fee solenoid L11.

Energization of the fee relay K320 also closes the contacts K320A1 and K320A3 (FIG. 27A). Closing of these contacts completes an energizing path for the relay K307, which path extends from the A.C. line 570 over the relay K307; the contacts K320A1; a point 574; a point 575; a point 576; the contacts K320A3; the point 573; the contacts SC11B1; the point 581; the contacts K308AC2; the point 580; the contacts K311B2; K301A2; K304B3; SC933A1; SC15B2; SC913A1; SC12B1; and SC3A1 to the other A.C. line 571. The relay K307 is effective to initiate the operating cycle of the accounting machine, in the manner fully described in the previously-mentioned United States patent application, Serial No. 610,754.

With regard to the above circuit path, it may be noted that, should the relay contacts K320A3 fail to close for any reason, an alternate circuit path is available over the No. 4, or "Posting I," position of the switch SR1B (FIG. 27A), which by-passes the contacts K320A3. It will also be noted that, in the event the switch SR1B, controlled by the function control knob, is set to No. 6, or "Posting II," position, such an alternate path is not available.

The fee relay K320 and the solenoid L10 are deenergized at 5 degrees of operation of the accounting machine in the automatic fee cycle which follows the check-posting cycle, by opening of the contacts SC933A1 (FIG. 27A). This is also effective to cause the fee solenoid L11 (FIG. 27B) to be deenergized, since deenergization of the fee relay K320 causes the contacts K320A2 in the energizing circuit for the solenoid L11 to be opened. In addition, the relay K307 is deenergized at 5 degrees during the automatic fee cycle of accounting machine operation by opening of the contacts SC933A1.

In the even that the fee program selector 78 is in its No. 2, or "check and deposit fee," position, the levels A and B of the switch SR2, shown as SR2A and SR2B in FIG. 27B, are in their No. 2 position, and either a "check" or "deposit" row 2 posting operation will cause energization of the fee relay K320, the key interlock solenoid L10, the fee solenoid L11, and the relay K307 for initiating machine operation. The energizing circuits for the solenoid L10 and the relay K320, when a "deposit" or "deposit correction" operation is initiated, extend over the No. 2 position of the switch SR2A, and the No. 3 or No. 6 position of switch SR3. In case of a "check" or "check correction" operation, the energizing circuits for the solenoid L10 and the relay K320 extend over position 2 of the switch SR2B and the No. 4 or No. 8 position of the switch SR3. In other respects, the energizing circuits for the relay K320 and the solenoid L10 are the same as those described for an operation in which the various levels of the switch SR2, controlled by the fee program selector 78, are in position 1.

Certain exceptions to the sequence of operations described above may be noted. When any one of the following row 3 keys 67, including Service Charge, Debit Memo, Credit Memo, List, or No Charge, is depressed, the row 3 contacts SC33B1 (FIG. 27B) in the energizing circuit for the solenoid L10 are opened, and the solenoid L10 is accordingly prevented from energizing. This in turn prevents energization of the fee relay K320, since, with the solenoid L10 deenergized, the zero stop throwout shaft 118 will not be oscillated, and the contacts SC1B2 will not close. As a consequence, no automatic fee operation can take place.

In the event that any amount keys, check count keys, or control keys of rows 1, 2, or 3 have been depressed following a posting operation, it will be noted that, while the key interlock solenoid L10 energizes, depression of any one of the above keys prevents oscillation of the zero stop throwout shaft 118 (FIG. 26) in the manner previously described and thereby prevents energization of the fee relay K320. A depressed key may be released by depression of the key release lever 71 (FIG. 3). Downward movement of the key release lever 71 opens the contacts SC12B1 (FIG. 27A), causing deenergization of the solenoid L10. Subsequent release of the key release lever 71 enables the contacts SC12B1 to close once again, thereby effecting immediate reenergization of the solenoid L10, which enables the normal cycle of operation to continue, with the fee relay K320 being energized, and the operations which follow such energization taking place in the sequence previously described.

It may also be noted that it is mechanically impossible for a machine operator to depress an amount or check count key or a key in control rows 1, 2, or 3 after the key interlock solenoid L10 has been energized, since the zero stop throwout shaft 118 will then have commenced oscillation and will mechanically block the depression of any of these keys.

When the program fee selector 78 is in its No. 3 position, no fee operation takes place, and the accounting machine operates in a conventional manner, as described in the previously-mentioned United States patent application, Serial No. 610,754.

Let it now be assumed that the program fee selector 78 has been shifted to its No. 4 position, which is the "statement fee," or "monthly fee," position. In such event, the levels A, B, and C of the switch SR2, shown in FIG. 27B as switches SR2A, SR2B, and SR2C, are positioned in No. 4 position. Now, when the row 2 indication switch SR3 is set to its No. 1 "overdraft pickup" position, or to its No. 9 "balance pickup" position, an energizing circuit is completed for the solenoid L10 by closing of the contacts SC933A1 at about 325 degrees of the cycle of accounting machine operation. This energizing circuit extends from the A.C. line 570 over the contacts SC31A1; the solenoid L10; the No. 4 position of the switch SR2B (thereby bypassing the contacts SC33B1 controlled by row 3); the points 577 and 578; the No. 4 position of switch SR2A; the No. 1 or No. 9 position of the switch SR3; the "Posting I" or "Posting II" position of switch SR1D; the point 572; the point 573; the contacts SC11B1; the point 581; the contacts K308AC2; the point 580; the contacts K311B2; K301A2; K304B3; SC933A1; SC15B2; SC913A1; SC12B1; and SC3A1 to the other A.C. line 571.

Subsequently, the energizing circuit for the relay K320 is completed by closing of the contacts SC943A1 at 350 degrees of the cycle of accounting machine operation. This circuit extends from the A.C. line 570 over the contacts SC31A1; the contacts SC943A1; the fee relay K320; the contacts SC1B2; the point 578; the No. 4 position of the switch SR2A; the No. 1 or No. 9 position of the row 2 indication switch SR3; the "Posting I" or "Posting II" position of the switch SR1D; the point 572; the point 573; the contacts SC11B1; the point 581; the contacts K308AC2; the point 580; the contacts K311B2; K301A2; K304B3; SC933A1; SC15B2; SC913A1; SC12B1; and SC3A1 to the A.C. line 571.

In the same manner as previously described, the energization of the fee relay K320 is effective to cause energization of the fee solenoid L11, and energization of the relay K307, to initiate the operating cycle of the accounting machine.

At 5 degrees of the next cycle of accounting machine operation, the contacts SC933A1 open, and the fee relay K320, the key interlock solenoid L10, and the fee solenoid L11 are deenergized.

In this same cycle of operation, through the mechanical control of the row 2 transaction bank shown in FIGS. 22 to 24 inclusive, and previously described, the common of the switch SR3 is shifted to its No. 2, or "fee," position. This prepares an energizing circuit for the new balance solenoid L7 (FIG. 27B), which is energized at 345 degrees of the cycle of accounting machine operation by the closing of contacts SC941 (FIG. 27B). The energizing circuit extends from the A.C. line 570 over the contacts SC941; the solenoid L7; the contacts SC4B2, which are contacts associated with the Clear Totals and Sub-Totals control keys 69 of row 1 to provide necessary interlock functions, and which are closed unless a clear total or sub-total operation is attempted to be initiated; the contacts SC1A1, which are closed unless the zero stop throwout shaft has been oscillated; the contacts SC20A1, which insure that there will not be a repeat operation of a new balance operation; a point 579; position No. 4 of level C of the switch SR2, shown in FIG. 27B as switch SR2C; the No. 2 position of the row 2 indication switch SR3; the "Posting I" or "Posting II" position of the switch SR1D; the point 572; the point 573; the contacts SC11B1; the point 581; the contacts K308AC2; the point 580; the contacts K311B2; K301A2; K304B3; SC933A1; SC15B2; SC913A1; SC12B1; and SC3A1 to the other A.C. line 571.

Enerergization of the solenoid L7 will initiate a new balance operation of the accounting machine, in the manner fully described in the previously-mentioned United States patent application, Serial No. 610,754.

It will be noted that a conventional new balance operation may also be initiated by depression of the New Balance key 66 on the accounting machine keyboard, or by depression of a second New Balance key (not shown) on the accounting machine. These two New Balance keys control contacts SP5A1 and SP8A1, respectively, which are connected in parallel in an energizing circuit for the solenoid L7, which also includes the function control switch SR1E, when it is in its "Transfer," "Posting I," or "Posting II" position, and in addition includes the cam-controlled contacts SC934. When either of the contacts SP5A1 or SP8A1 are closed, the new balance solenoid L7 is energized over a circuit which extends from the A.C. line 570 over the contacts SC941; the new balance solenoid L7; the contacts SC4B2; SC1A1; SC20A1; SP5A1 or SP8A1; SR1E; and SC934 to the other A.C. line 571.

Overdraft Control Circuit

Electrical means are provided for establishing an overdraft condition in the operating circuitry. The contacts SC32A1 (FIG. 27B) are mechanically controlled by the accounting machine and are normally held in their open condition, except when an overdraft condition takes place, as evidenced in the accounting machine by the condition of the totalizers. When an overdraft condition occurs, the contacts SC32A1 close to complete an energizing circuit for the overdraft relay K310, which circuit extends from the A.C. line 570 over the relay K310 and the contacts SC32A1 to the A.C. line 571.

Energization of the relay K310 opens the normally closed contacts K310B1 (FIG. 27A) in the energizing circuit for the relay K307, to interrupt said circuit. It will be seen that the contacts K310B1 may be by-passed in the energizing circuit for the relay K307 by manually operating the overdraft contacts SP9A1 (FIG. 27A) or by shifting the function control knob (not shown), which controls the switch SR1G (FIG. 27A) to "Install," "Add," "Trial Balance," or "Transfer" positions.

The overdraft relay K310 also controls contacts (not shown) in a circuit for an indicating light, so that energization of the relay K310 in response to an overdraft condition in the accounting machine closes these contacts to cause said light to be illuminated to indicate an overdraft condition to the machine operator.

Energization of Trip Relay K307

A plurality of paths for energizing the accounting machine trip relay K307 (FIG. 27A) are provided. As previously indicated, this relay must be energized to initiate an operation of the accounting machine.

A holding circuit path extends from the A.C. line 570 over the relay K307 and the relay contacts K307A1, which are closed by energization of the relay K307, to a point 580. The point 580 is connected to the other A.C. line 571 over the series of contacts which have been described previously and which include the contacts K311B2; K301A2; K304B3; SC933A1; SC15B2; SC913A1; SC12B1; and SC3A1. In subsequent descriptions of circuit paths for energizing the relay K307, these contacts will not be specifically referred to, in the interests of conciseness. It will be seen that energization of the relay K307, over any other circuit path, closes the contacts K307A1 to complete the path described above and to thereby provide a holding circuit to maintain the relay K307 in an energized condition. This holding circuit is interrupted at a predetermined time in the operating cycle of the accounting machine by the opening of one of the contacts located in the path which extends between the point 580 and the A.C. line 571.

A first path over which the relay K307 may be energized has already been described; namely, the path utilized to energize the relay K307 in an automatic fee operation. Accordingly, the description of said path will not be repeated here.

A further path over which the relay K307 may be energized extends from the A.C. line 570 over the relay K307; one of the three parallel-connected paths previously described, including the contacts SP9A1, the contacts K310B1, and the switch SR1G; the normally-closed contacts SC34, which were previously described and which are opened by the operation of the solenoid L10 to prevent a manual row 2 operation when an automatic fee operation is to be performed; the contacts SC22A1, which are normally open and which are closed by depression of any row 2 control key; the contacts SC5B1, which are machine-controlled, normally-closed contacts which open when the available printing area on a ledger card has been exhausted, in order to prevent improper printing on said card; the points 575 and 574; the contacts SP3A1, which are controlled manually from a pushbutton-type switch on the accounting machine and which are used when it is desired to "remake" a card; that is, to create a new ledger card bearing the information contained on an old ledger card which has been damaged or otherwise rendered unfit for use with the accounting machine; a point 581; the contacts K308AC2, which are operated by the gate check relay and are normally closed except when a gate check condition exists in the accounting machine, indicating improper pickup of information from the ledger card; the point 580; and the previously-described series of contacts which extend between the point 580 and the A.C. line 571. It will be seen that the above energizing path for the relay K307 is employed when it is desired to operate the accounting machine for a "remake" operation.

An additional path over which the relay K307 may be energized extends from the A.C. line 570 over the relay K307; one of the three parallel-connected previously-described paths, including the contacts SP9A1, the contacts K310B1, and the switch SR1G; the contacts SC34; the contacts SC22A1; the contacts SC16A1, which are normally-open contacts closed by depression of the Analysis key 68 in row 2 of the accounting machine keyboard and which by-pass the contacts SC5B1, since an analysis operation may properly be performed by the accounting machine even when the normal capacity of the ledger card has been reached; the point 573; the contacts SC11B1, which are controlled by the step cam of the accounting machine to open when the ledger card is positioned in the accounting machine to its "zero line" position, in order to prevent any posting operation from being recorded in the "zero line" of the accounting machine; the point 581; the gate check contacts K308AC2; the point 580; and the series of contacts previously described, which extend between the point 580 and the A.C. line 571. It will be seen that the relay K307 is energized for operation of the accounting machine over the above-described circuit path when an analysis operation is performed.

An additional energizing path for the relay K307 extends from the A.C. line 570 over the relay K307; the parallel combination of contacts SP9A1, contacts K310B1, and the switch SR1G, described previously; the contacts SC34; the contacts SC22A1; the contacts SC5B1; the point 575; the contacts SC4A1, which are normally open and which are closed by depression of the "Clear-Total" or "Sub-Total" control keys 69 in row 1 of the accounting machine keyboard; the points 583 and 581; the contacts K308AC2; the point 580; and the contacts extending between said point and the other A.C. line 571. This path enables a sub-total or clear-total operation to be made by the accounting machine, using either the Overdraft Pickup key or the Balance Pickup key 68 of row 2 in addition to the appropriate key of row 1.

Further energizing paths for the relay K307 extend through various contacts of the switch SR1B controlled by the function control mechanism which may be set in any desired position by use of the function control knob (not shown). The wiper of the switch SR1B is connected over a point 581 to the point 575 in the energizing circuit for the relay K307; the contacts of the switch SR1B corresponding to the "Add" and "Install" positions of the switch SR1B are connected over the point 583 to the point 581 in the energizing circuit for the relay K307; and the contact of the switch SR1B corresponding to the "Posting I" position of the switch SR1B to which the wiper is shown positioned in FIG. 27A, is connected over a point 582 to the point 573 in the energizing circuit for the relay K307. Accordingly, when the function control knob is set to "Add" or "Install" positions, an energizing circuit may be completed for energizing the relay K307, said circuit extending from the A.C. line 570 over the relay K307; one of the parallel-connected combination of contacts SP9A1, contacts K310B1, or the switch SR1G; the contacts SC34; the contacts SC22A1; the contacts SC5B1; the contacts SC22A1; the points 575 and 581; the switch SR1B; the points 583 and 584; the contacts K308AC2; the point 580; and the previously-described contacts extending between the point 580 and the A.C. line 571. When the function control knob is set to "Posting I" position, an energizing circuit for the relay K307 may be completed from the A.C. line 570 over the relay K307; one of the parallel-connected combination of contacts SP9A1, contacts K310B1, or the switch SR1G; the contacts SC34; the contacts SC22A1; the contacts SC5B1; the points 575 and 581; the switch SR1B; the points 582 and 573; the contacts SC11B1; the point 581; the contacts K308=AC2; the point 580; and the contacts extending between said point and the other A.C. line 571. It will be noted that, when the switch SR1B is in "Add" or "Install" positions, the contacts SC11B1, which open when the ledger card is positioned in the accounting machine to its "zero line" position, as previously described, are by-passed, whereas, when the switch SR1B is positioned to its "Posting I" position, the contacts SC11B1 remain in the circuit, so that energization of the relay K307, when the ledger card is in its "zero line" position, is prevented.

Another path for energization of the relay K307 extends between the points 576 and 573 and includes the normally-open contacts K318A1. The contacts K318A1 are controlled by the comparator relay (not shown) in the accounting machine, and, when this relay is energized, the contacts K318A1 are closed in an energizing path for the relay K307, which path extends from the A.C. line 570 over the relay K307; one of the parallel-connected combination of contacts SP9A1, contacts K310B1, or the switch SR1G; the contacts SC34; the contacts SC22A1; the contacts SC5B1; the points 575 and 576; the contacts K318A1; the point 573; the contacts SC11B1; the point 581; the contacts K308AC2; the point 580; and the contacts extending between said point and the other A.C. line 571.

A similar path for energization of the relay K307 extends between the points 576 and 573 and includes the normally-open contacts K315A2, which are controlled by the comparator input relay (not shown), which may be energized by depression of a manually-operable push button (not shown) on an accounting machine control panel to close a switch in the energizing circuit for the comparator input relay. This push button is used in operations in which data is indexed manually into the accounting machine keyboard, rather than being picked up from magnetic coating on the ledger card. The energizing circuit for the relay K307 is identical to that previously described, which includes the relay contacts K318A1, except that this path extends over the contacts K315A2, rather than the contacts K318A1, between the points 576 and 573.

In connection with the circuit paths described above for energizing the relay K307, it may be noted that, since the contacts K320A3 are in parallel with the contacts K315A2 and K318A3, the contacts K320A3 are effective to by-pass said contacts when closed, so that, in an automatic fee operation, the relay K307 may be energized regardless of the condition of the contacts K315A2 and K318A3.

A further path for energization of the relay K307 extends between the points 575 and 573 and includes a set of contacts ST5 and the normally-closed contacts SC25B2. The contacts SC25B2 are controlled by the row 2 Deposit key 68 and are caused to open when said key is depressed. The contacts ST5 are controlled by the key-operated switch 77, located on the accounting machine keyboard, and may be set to open position when it is desired to require that the account number of every deposit, as well as every check, posted be compared with the account number magnetically coded on the ledger card.

Means are provided to enable a corrective operation of the accounting machine to be made following a trial balance operation in which a "gate check" condition occurs, indicating that information was not correctly sensed from the ledger card by the accounting machine. In order to accomplish this, it is necessary that the contacts K308AC2, which are controlled by the "gate check" relay (not shown) and which are normally open when the "gate check" relay is deenergized following a "gate check" condition, be by-passed. A by-pass circuit extends through the "Trial Balance" position of the switch SR1C (FIG. 27A) controlled by the function control knob, and through relay contacts K308BC2, which are controlled by the "gate check" relay, to close when said "gate check" relay is deenergized in response to a "gate check" condition. This energizing circuit for the relay K307 extends from the A.C. line 570 over the relay K307; one of the parallel connected paths including contacts SP9A1, contacts K310B1, and the switch SR1G; the contacts SC34; the contacts SC22A1; the contacts SC5B1; the point 575; the contacts K308BC2; the points 581 and 583; the "Trial Balance" position of the switch SR1C; the point 580; and the previously-described contacts which extend between the point 580 and the other A.C. line 571. The Overdraft Pickup key or the Balance Pickup key 68 of row 2 may thus be employed to initiate a corrective operation, with the relay K307 being energized over the circuit described above.

*New Balance Operation*

The energization of the relay K307 is also required for initiation of a new balance operation. In a normal new balance operation, this is accomplished by closing of contacts SC21A1 (FIG. 27A), which are under control of the new balance solenoid L7. The energizing circuit for the relay K307 in a new balance operation normally extends from the A.C. line 570 over the relay K307; the contacts K310B1; the contacts SC21A1; the normally-closed contacts SC16B2, controlled by the row 1 Sub-Balance key 69; a point 585; the switch SR1C, in every position except "Trial Balance"; the point 580; and the previously-described contacts extending between the point 580 and the other A.C. line 571. The above energizing circuit is not affected by the existence of a "gate check" condition. A new balance operation may also be initiated regardless of whether or not an overdraft condition is in existence, if the manually-controlled contacts SP9A1 are closed, or if the function control knob is in "Add," "Trial Balance," "Transfer," or "Install" positions, to set the switch SR1G correspondingly. It will be seen that either the contacts SP9A1 or the switch SR1G, when set to one of the above-enumerated positions, is capable of by-passing the overdraft contacts K310B1.

A new balance operation may also be initiated with the function control knob in "Trial Balance" position, providing that no "gate check" condition exists. So long as there is no "gate check" condition, the contacts K308A3 (FIG. 27A) are closed, and these contacts are effective to by-pass the switch SR1C in the new balance energizing circuit for the relay K307, since they are in parallel with the switch SR1C between a point 585 and the point 580.

Connected in parallel with the contacts SC16B2 are contacts SC24A1 and contacts K312A4. The contacts SC16B2 are controlled by the "Sub-Balance" key 69 of row 1 and are opened when said key is depressed. This prevents the taking of a sub-balance immediately following a balance pickup, since such an operation would accomplish nothing and would merely use up space on the ledger card. The contacts SC24A1 and K312A4 in parallel with the contacts SC16B2 are provided to enable a sub-balance operation to be performed at any time other than immediately following a balance pickup operation. The contacts SC24A1 are controlled by the step cam of the line-finding mechanism in the accounting machine, which is fully described in the previously-mentioned United States patent application, Serial No. 610,754. These contacts are so controlled that they are closed when the step cam is in home position, but are open at all other times. Since the step cam is shifted out of home position during a balance pickup operation, these contacts will be open following a balance pickup operation. The contacts K312A4 are controlled by a relay which in turn is controlled by the position of the table holding the ledger card. This relay is energized whenever the table is not in home position, and therefore the contacts K312A4 are closed whenever the table is not in home position. Since the table is in home position immediately following a balance pickup operation, it will be seen that the contacts K312A4 are open at such a time. Since either the contacts SC24A1 or the contacts K312A4, or both of said contacts, will be closed at all times except immediately following a balance pickup operation, it will be seen that the only time that a sub-balance cannot be made is immediately following a balance pickup operation.

Although the various components disclosed of the operating circuitry of the accounting machine have been explained only in connection with a few of the many operations of the accounting machine which it is possible to perform, it is believed that this description is sufficient for a clear understanding of the invention.

While the form of mechanism shown and described herein is admirably adapted to fulfill the objects primarily stated, is to be understood that it is not intended to confine the invention to the one form or embodiment disclosed herein, for it is susceptible of embodiment in various other forms within the scope of the appended claims.

What is claimed is:

1. In a device of the class described, cyclically operable to perform various types of accounting operations, including posting operations, the combination comprising totalizers for accumulating and storing amount information therein; differential mechanism for entering amount information into said totalizers; automatic entry means for controlling said differential mechanisms to cause the entry of a predetermined amount into said totalizers; manually operable means selectively settable to a plurality of different positions to control whether or not predetermined amounts are to be entered into said totalizers following certain operations; first multiple-position switching means controlled by the manually operable means; second multiple-position switching means set in accordance with the type of operation performed; operating means controlled by said first and second multiple-position switching means and operable to cause a further automatic cycle of operation following a posting operation; means controlled by said manually operable means and operable to shift said automatic entry means to determine the predetermined amount which is to be entered into the totalizers by the differential mechanism under control of said automatic entry means; and control means actuated by said operating means to render said automatic entry means effective in said further automatic cycle of operation to enter said selected predetermined amount into said totalizers.

2. In a device of the class described, cyclically operable to perform various types of accounting operations, including posting operations, said device including computing mechanism and having storage means for retaining amounts therein, the combination comprising manually operable means selectively settable to a plurality of different positions to control whether or not predetermined amounts are to be entered into said storage means following certain operations; first multiple-position switching means controlled by the manually operable means; second multiple-position switching means settable in accordance with the type of operation performed; operating means controlled by said first and second multiple-position switching means and operable to cause a further automatic cycle of operation following a posting operation; entry means for effecting the entry of a selected one of a plurality of predetermined amounts into said storage means; means controlled by said manually operable means to determine the predetermined amount which is to be entered into the storage means by the entry means; and control means actuated by said operating means to render the entry means effective in said further automatic cycle of operation to enter said selected predetermined amount into said storage means.

3. In a device of the class described, cyclically operable to perform various types of accounting operations, including posting operations, said device including computing mechanism and having storage means for retaining amounts therein, the combination comprising first settable means selectively settable to a plurality of different positions to control whether or not predetermined amounts are to be entered into said storage means following certain operations, second settable means settable in accordance with the type of operation performed; operating means controlled by said first and second settable means and operable to cause a further automatic cycle of operation following a posting operation; entry means for effecting the entry of a selected one of a plurality of predetermined amounts into said storage means; means controlled by said first settable means to determine the predetermined amount which is to be entered into the storage means by the entry means; and control means actuated by said operating means to render the entry means effective in said further automatic cycle of operation to enter said selected predetermined amount into said storage means.

4. In a device of the class described, cyclically operable to perform various types of accounting operations, including posting operations, said device including computing mechanism and having storage means for retaining amounts therein, the combination comprising first settable means selectively settable to a plurality of different positions to control whether or not predetermined amounts are to be entered into said storage means following certain operations; second settable means settable in accordance with the type of operation performed; operating means controlled by said first and second settable means and operable to cause a further automatic cycle of operation following a posting operation; entry means for effecting entry of a predetermined amount into said storage means; control means actuated by said operating means to render the entry means effective in said further automatic cycle of operation to enter the predetermined amount into said storage means; and means to disable said operating means in the event that said device is not in proper condition for automatic operation.

5. In a device of the class described, cyclically operable to perform various types of accounting operations, including posting operations, said device including computing mechanism and having storage means for retaining amounts therein, the combination comprising first settable means selectively settable to a plurality of different positions to control whether or not predetermined amounts are to be entered into said storage means following certain operations; second settable means settable in accordance with the type of operation performed; operating means controlled by said first and second settable means and operable to cause a further automatic cycle of operation following a posting operation; entry means for effecting the entry of a predetermined amount into said storage means; and control means actuated by said operating means to render the entry means effective in said further automatic cycle of operation to enter said predetermined amount into said storage means.

6. In a device of the class described, constructed and arranged to perform various types of accounting operations, including posting operations, the combination comprising totalizers for accumulating and storing amount information therein; differential mechanism for entering amount information into said totalizers; automatic entry means for controlling said differential mechanism to cause the entry of predetermined amounts into said totalizers; operating means to control said device to cause a further automatic operation following a posting operation; control means actuated by said operating means to control said automatic entry means in said further automatic operation to effect the entry of said predetermined amounts into said totalizers; settable means positioned according to the type of operation performed by said device in its previous cycle; sensing means for sensing the settable means; and further control means controlled by the sensing means and operable to determine whether said predetermined amount is to be added to or subtracted from an amount already contained in said totalizers.

7. In a device of the class described, cyclically operable to perform various types of accounting operations, including posting operations, said device including computing mechanism and having storage means for retaining amounts therein, the combination comprising operating means to control said device to cause a further automatic cycle of operation following a posting operation; entry means for effecting entry of a predetermined amount into said storage means; control means actuated by said operating means to render the entry means effective in said further automatic cycle of operation to enter said predetermined amount into said storage means; settable means positioned according to the type of operation performed by said device in its previous cycle; sensing means for sensing the settable means; and further control means controlled by the sensing means and operable to determine whether said predetermined amount is to be added to or subtracted from an amount already contained in said storage means.

8. In a device of the class described, cyclically operable to perform various types of accounting operations, including posting operations, said device including computing mechanism and having storage means for retaining amounts therein, the combination comprising operating means to control said device to cause a further automatic cycle of operation following a posting operation; entry means for effecting entry of a predetermined amount into said storage means; control means actuated by said operating means to render the entry means effective in said further automatic cycle of operation to enter said predetermined amount into said storage means; and further control means operable to determine whether said predetermined amount is to be added to or subtracted from an amount already contained in said storage means.

9. In a device of the class described, cyclically operable to perform various types of accounting operations, including balance operations, said device including computing mechanism and having storage means for retaining amounts therein, the combination comprising operating means to control said device to cause a further automatic cycle of operation following a balance operation; entry means for effecting the entry of a predetermined amount into the storage means; first control means actuated by said operating means to render the entry means effective in said further automatic cycle of operation to enter said predetermined amount into said storage means; second control means to initiate an additional balance operation following said further automatic cycle of operation; overdraft means responsive to the existence of an overdraft condition in said storage means; and means controlled by said overdraft means to prevent the initiation of said additional balance operation.

10. In a device of the class described, cyclically operable to perform various types of accounting operations, including balance operations, the combination comprising totalizers for accumulating and storing amount information therein; differential mechanism for entering amount information into said totalizers; automatic entry means for controlling said differential mechanism to cause the entry of a predetermined amount into said totalizers; operating means to control said device to cause a further automatic cycle of operation following a balance operation; first control means actuated by said operating means to control said automatic entry means in said further automatic cycle of operation to effect the entry of said predetermined amount into said totalizers; and second control means to initiate automatically an additional balance operation following said further automatic cycle of operation.

11. In a device of the class described, cyclically operable to perform various types of accounting operations, including balance operations, said device including computing mechanism and having storage means for retaining amounts therein, the combination comprising first settable means selectively settable to a plurality of different positions to control whether or not predetermined amounts are entered into said storage means following certain operations; second settable means settable in accordance with the type of operation performed; operating means controlled by said first and second settable means and operable to cause a further automatic cycle of operation following a balance operation; entry means for effecting the entry of a predetermined amount into said storage means; first control means actuated by said operating means to render the entry means effective in said further automatic cycle of operation to enter said predetermined amount into said storage means; and second control means to initiate an additional balance operation following said further automatic cycle of operation.

12. In a device of the class described, cyclically operable to perform various types of accounting operations, including balance operations, said device including computing mechanism and having storage means for retaining amounts therein, the combination comprising operating means to control said device to cause a further automatic cycle of operation following a balance operation; entry means for effecting the entry of a predetermined amount into said storage means; first control means actuated by said operating means to render the entry means effective in said further automatic cycle of operation to enter said predetermined amount into said storage means; and second control means to initiate an additional balance operation following said further automatic cycle of operation.

13. In a device of the class described, cyclically operable to perform various types of accounting operations, including posting operations, the combination comprising totalizers for accumulating and storing amount information therein; differential mechanism for entering amount information into said totalizers; automatic entry means for controlling said differential mechanism to cause the entry of a predetermined amount into said totalizers; first settable means selectively settable to a plurality of different positions to control whether or not predetermined amounts are to be entered into said totalizers following certain operations; second settable means set in accordance with the type of operation performed; operating means controlled by said first and second settable means and operable to cause a further automatic cycle of operation following a posting operation; control means actuated by said operating means to render said automatic entry means effective in said further automatic cycle of operation to enter the predetermined amount into said totalizers; and means to prevent a manually-initiated cycle of operation from taking place instead of said automatic cycle of operation, following a posting operation.

14. In a device of the class described, cyclically operable to perform various types of accounting operations, including posting operations, said device including computing mechanism and having storage means for retaining amounts therein, the combination comprising first settable means selectively settable to a plurality of different positions to control whether or not predetermined amounts are to be entered into said storage means following certain operations; second settable means settable in accordance with the type of operation performed; operating means controlled by said first and second settable means and operable to cause a further automatic cycle of operation following a posting operation; entry means for effecting entry of a predetermined amount into said storage means; control means actuated by said operating means to render the entry means effective in said further automatic cycle of operation to enter the predetermined amount into said storage means; and means to prevent a manually-initiated cycle of operation from taking place instead of said automatic cycle of operation, following a posting operation.

15. In a device of the class described, cyclically operable to perform various types of accounting operations, including posting operations, said device including computing mechanism and having storage means for retaining amounts therein, the combination comprising operating means to control said device to cause a further automatic cycle of operation following a posting operation; entry means for effecting the entry of a predetermined amount into the storage means; control means actuated by said operating means to render the entry means effective in said further automatic cycle of operation to enter said predetermined amount into said storage means; and means to prevent manual operation of said device between a posting operation and said further automatic cycle of operation.

16. In a device of the class described, constructed and arranged to perform various types of accounting operations, including posting operations, the combination comprising totalizers for accumulating and storing amount information therein; differential mechanism for entering amount information into said totalizers; manually-operable entry means for controlling said differential mechanism to cause entry of amounts into totalizers; automatic entry means for controlling said differential mechanism to cause the automatic entry of a predetermined amount into said totalizers; operating means to control said device to cause a further automatic operation following a posting operation; control means actuated by said operating means to control said automatic entry means in said further automatic operation to cause the entry of said predetermined amount into said totalizers; and means to disable said manually-operable entry means to prevent manual entry of information into said totalizers during said further automatic operation.

17. In a device of the class described, cyclically operable to perform various types of accounting operations, including posting operations, said device including computing mechanism and having storage means for retaining amounts therein, the combination comprising operating means to control said device to cause a further automatic cycle of operation following a posting operation; automatic entry means for effecting the entry of a predetermined amount into the storage means; manually-operable entry means for entering amounts into the storage means; control means actuated by said operating means to render the automatic entry means effective in said further automatic cycle of operation to enter said predetermined amount into said storage means; and means to prevent manual entry of information into said device by said manually-operable entry means during said further automatic cycle of operation.

18. In a device of the class described, cyclically operable to perform various types of accounting operations, including posting operations, said device including computing mechanism and having storage means for retaining amounts therein, the combination comprising operating means to control said device to cause a further automatic cycle of operation following a posting operation; entry means for effecting the entry of a predetermined amount into the storage means; control means actuated by said operating means to render the entry means effective in said further automatic cycle of operation to enter said predetermined amount in said storage means; counting means for counting the number of certain types of posting operations; and disabling means controlled by said control means to prevent operation of the counting means during said further cycle of operation.

19. In a device of the class described, cyclically operable to perform various types of accounting operations, including posting operations, said device including computing mechanism and having storage means for retaining amounts therein, the combination comprising operating means to control said device to cause a further automatic cycle of operation following a posting operation; entry means for effecting the entry of a predetermined amount into the storage means; control means actuated by said operating means to render the entry means effective in said further automatic cycle of operation to enter said predetermined amount into said storage means; manually-operable control means for effecting certain types of operation of said device; and means to prevent operation of said operating means during said certain types of operation of said device.

20. In a device of the class described, constructed and arranged to perform various types of accounting operations, including posting operations, the combination comprising totalizers for accumulating and storing amount information therein; differential mechanism for entering amount information into said totalizers; manually-operable entry means for controlling said differential mechanism for entering amount information into said totalizers during a posting operation; automatic entry means for controlling said differential mechanism to cause the entry of a predetermined amount into said totalizers; operating means to control said device to cause a further automatic operation following a posting operation; and control means actuated by said operating means to control said automatic entry means in said further automatic operation to effect the entry of said predetermined amount into said totalizers.

References Cited in the file of this patent

UNITED STATES PATENTS

| | | |
|---|---|---|
| 2,172,078 | Ziguelde | Sept. 5, 1939 |
| 2,195,850 | Cunningham et a. | Apr. 2, 1940 |

UNITED STATES PATENT OFFICE
CERTIFICATE OF CORRECTION

Patent No. 3,047,219                                     July 31, 1962

Russell E. Kneisley et al.

It is hereby certified that error appears in the above numbered patent requiring correction and that the said Letters Patent should read as corrected below.

Column 1, line 72, for "combinatipn" read -- combinations --; column 9, lines 57 and 58, for "121", each occurrence, read -- 211 --; column 14, line 26, for "intiation" read -- initiation --; column 24, line 24, for "It" read -- In --; column 26, line 16, for "even" read -- event --; column 27, line 74, for "Eneregization" read -- Energization --.

Signed and sealed this 15th day of January 1963.

(SEAL)
Attest:

ERNEST W. SWIDER
Attesting Officer

DAVID L. LADD
Commissioner of Patents